US012578726B2

(12) United States Patent
Sabe et al.

(10) Patent No.: US 12,578,726 B2
(45) Date of Patent: Mar. 17, 2026

(54) FLYING CAMERA AND A SYSTEM

(71) Applicant: Sony Group Corporation, Tokyo (JP)

(72) Inventors: Kohtaro Sabe, Tokyo (JP); Yasunori Kawanami, Tokyo (JP); Kenta Kawamoto, Tokyo (JP); Tsutomu Sawada, Tokyo (JP); Satoru Shimizu, Tokyo (JP); Peter Duerr, Tokyo (JP); Yuki Yamamoto, Chiba (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/820,369

(22) Filed: Aug. 30, 2024

(65) Prior Publication Data

US 2024/0427328 A1 Dec. 26, 2024

Related U.S. Application Data

(63) Continuation of application No. 18/591,014, filed on Feb. 29, 2024, now Pat. No. 12,332,645, which is a
(Continued)

(30) Foreign Application Priority Data

Apr. 19, 2013 (JP) ................................. 2013-088456

(51) Int. Cl.
*H04N 7/18* (2006.01)
*A63H 27/00* (2006.01)
(Continued)

(52) U.S. Cl.
CPC .......... *G05D 1/0094* (2013.01); *A63H 27/12* (2013.01); *A63H 30/04* (2013.01); *G05D 1/0016* (2013.01);
(Continued)

(58) Field of Classification Search
CPC ........................... G05D 1/0094; H04N 23/611
(Continued)

(56) References Cited

U.S. PATENT DOCUMENTS 8,930,044 B1* 1/2015 Peeters .................. B64C 19/00
709/201
2009/0002510 A1 1/2009 Uchihashi et al.
(Continued)

FOREIGN PATENT DOCUMENTS

CN 1647124 A 7/2005
CN 1953547 A 4/2007
(Continued)

OTHER PUBLICATIONS

Office Action issued Nov. 27, 2017, in China Patent Application No. 201410145463.7.
(Continued)

*Primary Examiner* — Amir Shahnami
(74) *Attorney, Agent, or Firm* — XSENSUS LLP

(57) ABSTRACT

There is provided a control device including an image display unit configured to acquire, from a flying body, an image captured by an imaging device provided in the flying body and to display the image, and a flight instruction generation unit configured to generate a flight instruction for the flying body based on content of an operation performed with respect to the image captured by the imaging device and displayed by the image display unit.

18 Claims, 34 Drawing Sheets

Related U.S. Application Data continuation of application No. 17/865,398, filed on Jul. 15, 2022, now Pat. No. 11,953,904, which is a continuation of application No. 16/953,386, filed on Nov. 20, 2020, now Pat. No. 11,422,560, which is a continuation of application No. 16/595,978, filed on Oct. 8, 2019, now Pat. No. 10,863,096, which is a continuation of application No. 16/118,173, filed on Aug. 30, 2018, now Pat. No. 10,469,757, which is a continuation of application No. 15/656,870, filed on Jul. 21, 2017, now Pat. No. 10,104,297, which is a continuation of application No. 14/227,182, filed on Mar. 27, 2014, now Pat. No. 9,749,540.

(51) Int. Cl.

| | | |
|---|---|---|
| *A63H 30/04* | (2006.01) | |
| *G05D 1/00* | (2006.01) | |
| *G05D 1/223* | (2024.01) | |
| *G05D 1/224* | (2024.01) | |
| *G05D 1/689* | (2024.01) | |
| *H04N 23/611* | (2023.01) | |

(52) U.S. Cl.

CPC ........... *G05D 1/0038* (2013.01); *G05D 1/223* (2024.01); *G05D 1/224* (2024.01); *G05D 1/689* (2024.01); *H04N 7/183* (2013.01); *H04N 23/611* (2023.01)

(58) Field of Classification Search

USPC .......................................................... 348/144
See application file for complete search history.

(56) References Cited

U.S. PATENT DOCUMENTS

| | | | |
|---|---|---|---|
| 2009/0195401 A1 | 8/2009 | Maroney et al. | |
| 2009/0244357 A1 | 10/2009 | Huang | |
| 2010/0084513 A1 | 4/2010 | Gariepy et al. | |
| 2010/0164698 A1 | 7/2010 | Tsubooka et al. | |
| 2011/0035054 A1 | 2/2011 | Gal et al. | |
| 2011/0074973 A1 | 3/2011 | Hayashi | |
| 2011/0221692 A1 | 9/2011 | Seydoux et al. | |
| 2011/0242366 A1 | 10/2011 | Yamashita et al. | |
| 2011/0264314 A1* | 10/2011 | Parras ................. | G05D 1/0676 701/16 |
| 2011/0282568 A1 | 11/2011 | Khatwa et al. | |
| 2011/0298923 A1 | 12/2011 | Mukae | |
| 2012/0043411 A1 | 2/2012 | Beck et al. | |
| 2012/0078451 A1 | 3/2012 | Ohtomo et al. | |
| 2012/0083945 A1 | 4/2012 | Oakley et al. | |
| 2012/0089274 A1 | 4/2012 | Lee et al. | |
| 2012/0143482 A1 | 6/2012 | Goossen et al. | |
| 2012/0191269 A1 | 7/2012 | Chen et al. | |
| 2012/0226394 A1 | 9/2012 | Marcus | |
| 2012/0307042 A1 | 12/2012 | Lee et al. | |
| 2013/0134254 A1* | 5/2013 | Moore ................... | B64U 10/60 244/17.11 |
| 2014/0008496 A1 | 1/2014 | Ye et al. | |
| 2014/0180914 A1 | 6/2014 | Abhyanker | |

FOREIGN PATENT DOCUMENTS

| | | | |
|---|---|---|---|
| CN | 101030074 A | 9/2007 | |
| CN | 101072332 A | 11/2007 | |
| CN | 101201248 A | 6/2008 | |
| CN | 101364177 A | 2/2009 | |
| CN | 101547313 A | 9/2009 | |
| CN | 101712379 A | 5/2010 | |
| CN | 101807081 A | 8/2010 | |
| CN | 201625423 U | 11/2010 | |
| CN | 102043964 A | 5/2011 | |
| CN | 102266672 A | 12/2011 | |
| CN | 102355574 A | 2/2012 | |
| CN | 102600612 A | 7/2012 | |
| CN | 102809969 A | 12/2012 | |
| CN | 202758243 U | 2/2013 | |
| CN | 102955478 A | 3/2013 | |
| EP | 1870870 A1 | 12/2007 | |
| JP | 2001186513 A | 7/2001 | |
| JP | 2005-208857 A | 8/2005 | |
| JP | 2006-027448 A | 2/2006 | |
| JP | 2006051864 A | 2/2006 | |
| JP | 2009188905 A | 8/2009 | |
| JP | 2011-215975 A | 10/2011 | |
| KR | 10-1083128 B1 | 11/2011 | |
| KR | 10-1204720 B1 | 11/2012 | |
| KR | 10-1252080 B1 | 4/2013 | |
| WO | 2004/010236 A1 | 1/2004 | |
| WO | 2004/088351 A1 | 10/2004 | |
| WO | 2013/034562 A1 | 3/2013 | |

OTHER PUBLICATIONS

Xu Wei, Developing Navigation Electronic Map for SUAV' GCS, Mechatronics, Dec. 31, 2006, 44-50.

\* cited by examiner

$V\theta = K\theta (Xt - Xf)$ $$Vx = Kx \ (Xt - Xf)$$

$$Vz = Kz \ (Syt - Syf)$$

FLYING CAMERA AND A SYSTEM

CROSS-REFERENCE TO RELATED APPLICATIONS

This application is a continuation of U.S. application Ser. No. 18/591,014, filed Feb. 29, 2024, which is a continuation of U.S. application Ser. No. 17/865,398, filed Jul. 15, 2022 (now U.S. Pat. No. 11,953,904), which is a continuation of U.S. application Ser. No. 16/953,386, filed Nov. 20, 2020 (now U.S. Pat. No. 11,422,560), which is a continuation of U.S. application Ser. No. 16/595,978, filed Oct. 8, 2019 (now U.S. Pat. No. 10,863,096), which is a continuation of U.S. application Ser. No. 16/118,173, filed Aug. 30, 2018 (now U.S. Pat. No. 10,469,757), which is a continuation of U.S. application Ser. No. 15/656,870, filed Jul. 21, 2017 (now U.S. Pat. No. 10,104,297), which is a continuation of U.S. application Ser. No. 14/227,182, filed Mar. 27, 2014 (now U.S. Pat. No. 9,749,540), which claims the benefit of priority under 35 U.S.C. § 119 from Japanese Priority Patent Application JP 2013-088456, filed Apr. 19, 2013. The entire contents of each of the above applications are incorporated herein by reference.

BACKGROUND

The present disclosure relates to a control device, a control method, and a computer program.

A technology relating to a method for imaging photographs using a camera installed in a radio-controllable flying body has been disclosed (for example, refer to JP 2006-27448A). Using the camera installed in such a flying body, it is possible to image photographs from the sky or a position in which a tripod is difficult to set. Imaging using a camera installed in a flying body brings various advantages in that costs can be suppressed, and safe imaging, imaging at a low altitude or in a narrow place, imaging in proximity to a target, and the like are possible in comparison to when a real aircraft or helicopter is used.

SUMMARY

In order to execute the imaging method described above, it is necessary to manipulate the flying body using a proportional control system (Propo) or the like and then manipulate the camera. Thus, in order to execute the imaging method described above, extensive training for freely manipulating the flying body is necessary, and further, training for manipulating the camera installed in the flying body is also indispensable.

Therefore, it is desirable to provide a novel and advanced control device, control method, and computer program that enable maneuvering of a flying body in which a camera is installed through an instantaneous operation.

According to an embodiment of the present disclosure, there is provided a control device including an image display unit configured to acquire, from a flying body, an image captured by an imaging device provided in the flying body and to display the image, and a flight instruction generation unit configured to generate a flight instruction for the flying body based on content of an operation performed with respect to the image captured by the imaging device and displayed by the image display unit.

According to an embodiment of the present disclosure, there is provided a control method including acquiring, from a flying body, an image captured by an imaging device provided in the flying body and displaying the image, and converting content of an operation performed with respect to the image captured by the imaging device and displayed in the step of displaying into a flight instruction for the flying body.

According to an embodiment of the present disclosure, there is provided a computer program causing a computer to execute acquiring, from a flying body, an image captured by an imaging device provided in the flying body and displaying the image, and converting content of an operation performed with respect to the image captured by the imaging device and displayed in the step of displaying into a flight instruction for the flying body.

According to the embodiments of the present disclosure described above, it is possible to provide a novel and advanced control device, control method, and computer program that enable maneuvering of a flying body in which a camera is installed through an instantaneous operation.

BRIEF DESCRIPTION OF THE DRAWINGS

FIG. 14 is a descriptive diagram showing an example of information displayed on a display unit 210 of the controller 200 according to the embodiment of the present disclosure;

3

4

Figure 15:
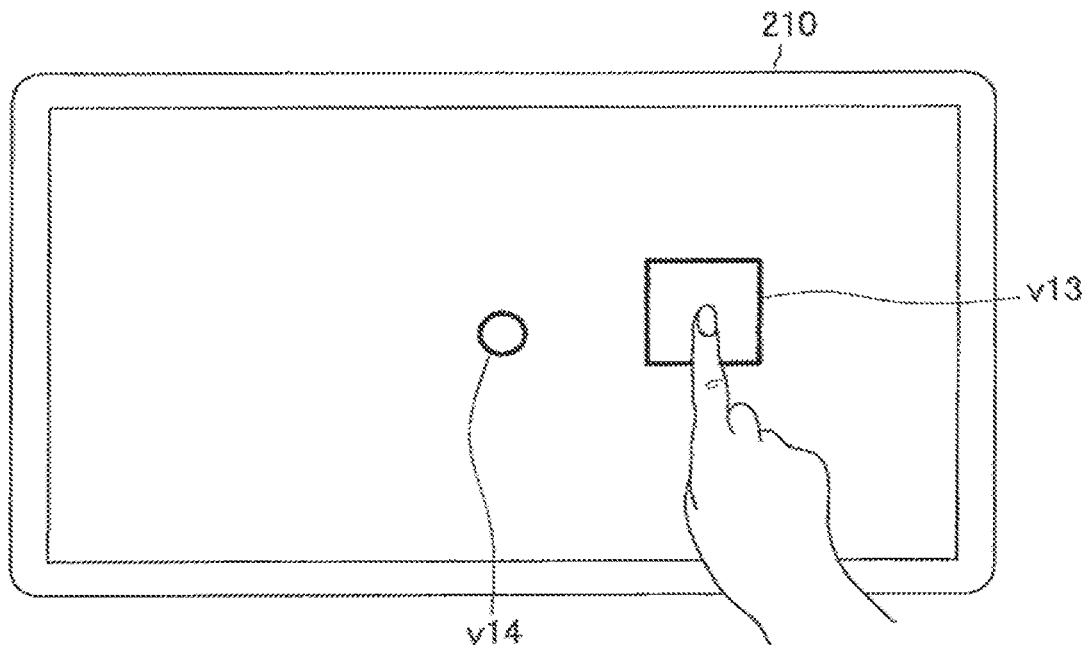
Figure 16:
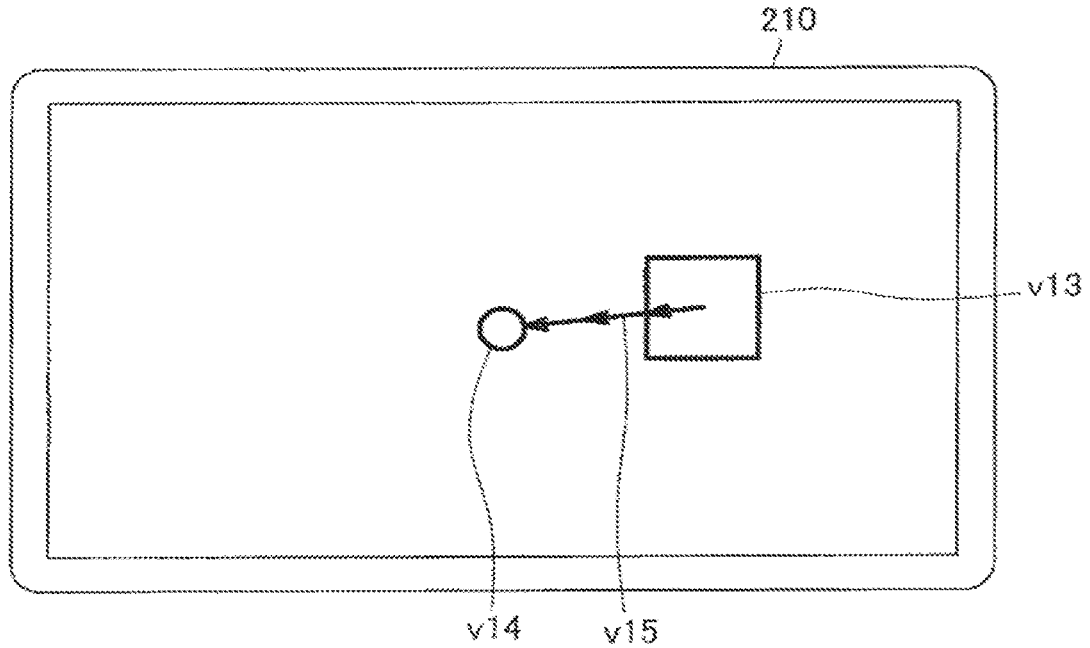
Figure 17:
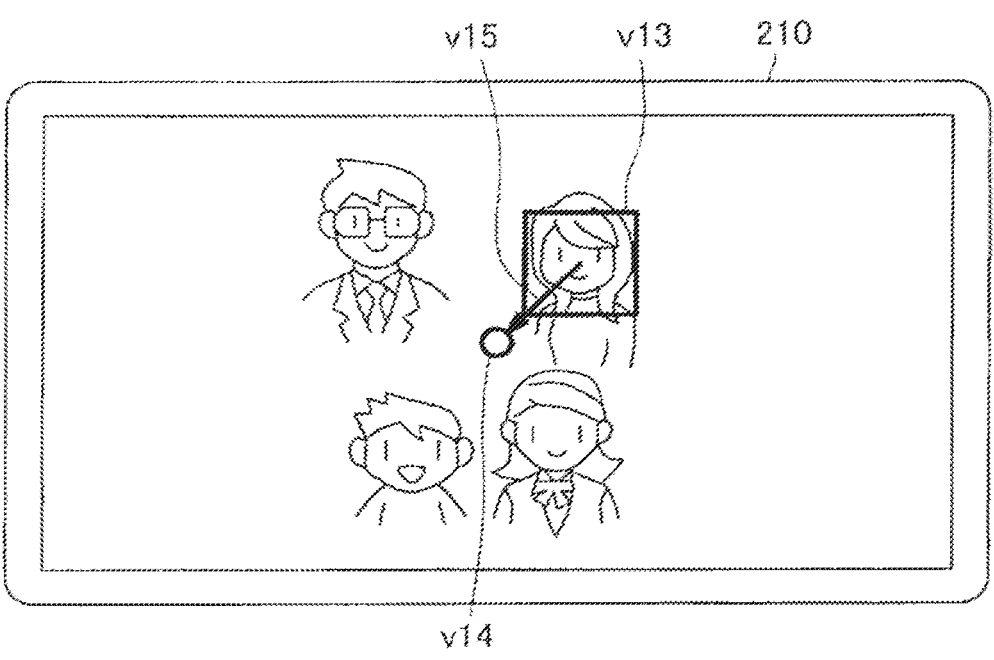
Figure 18:
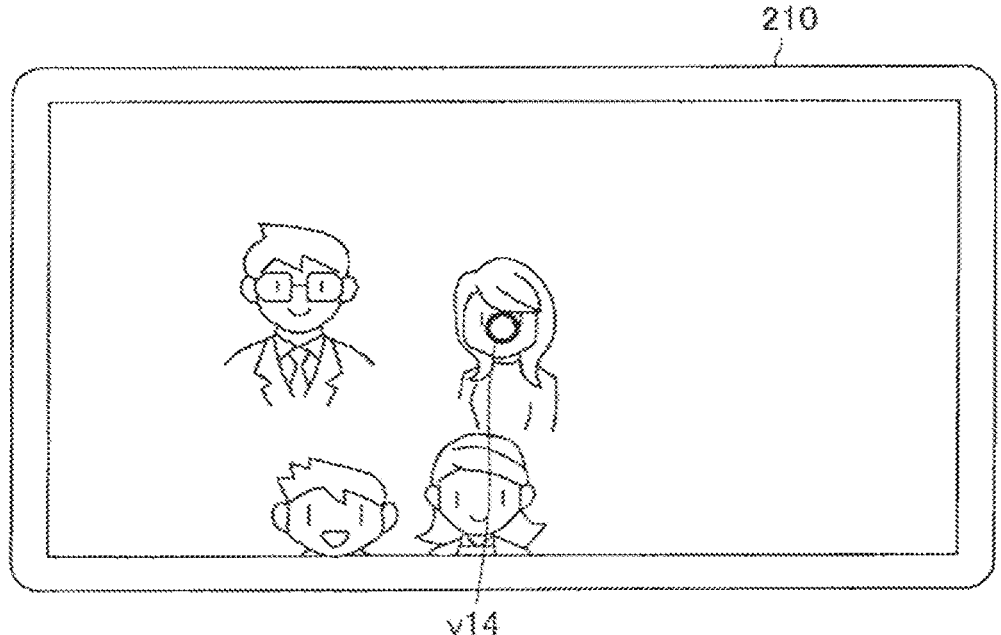
Figure 19:
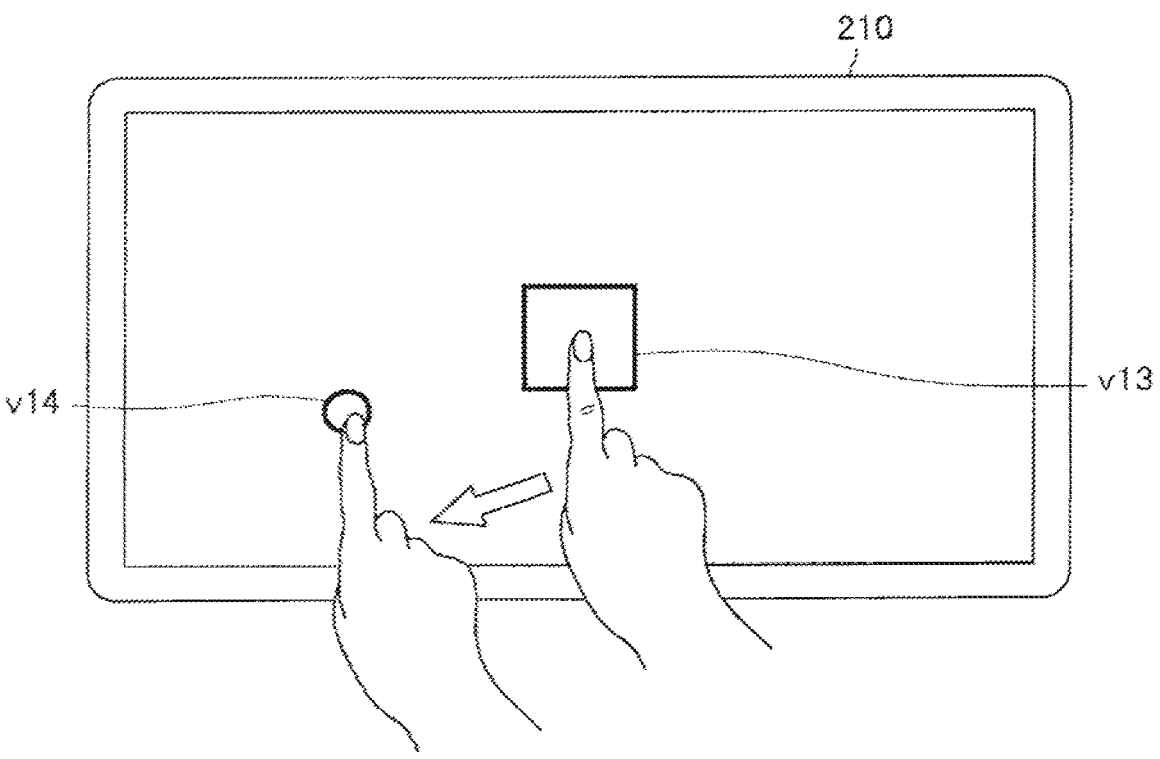
Figure 20:
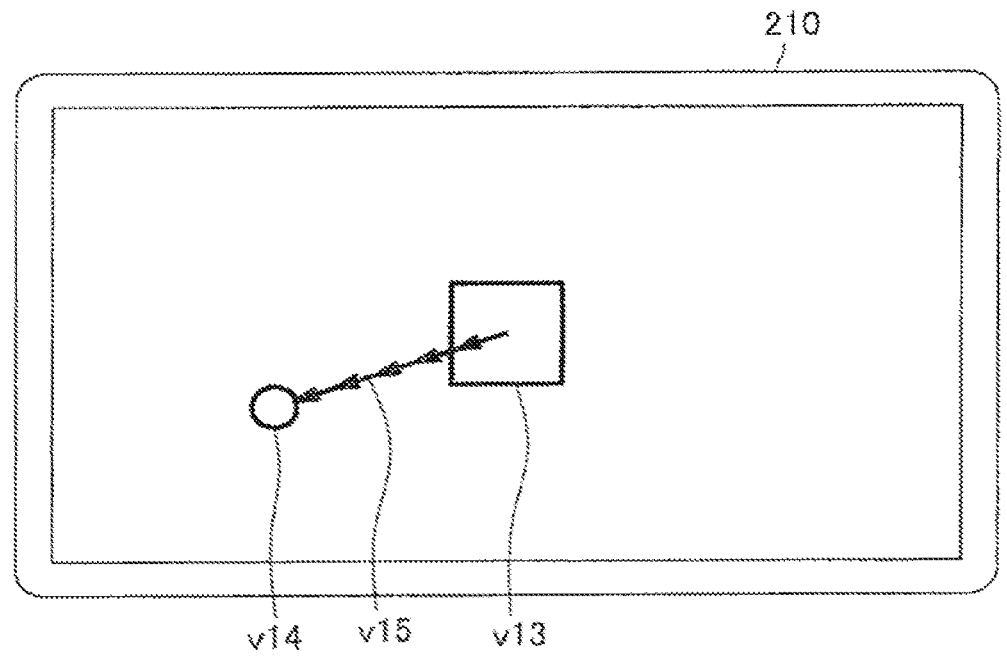
Figure 21:
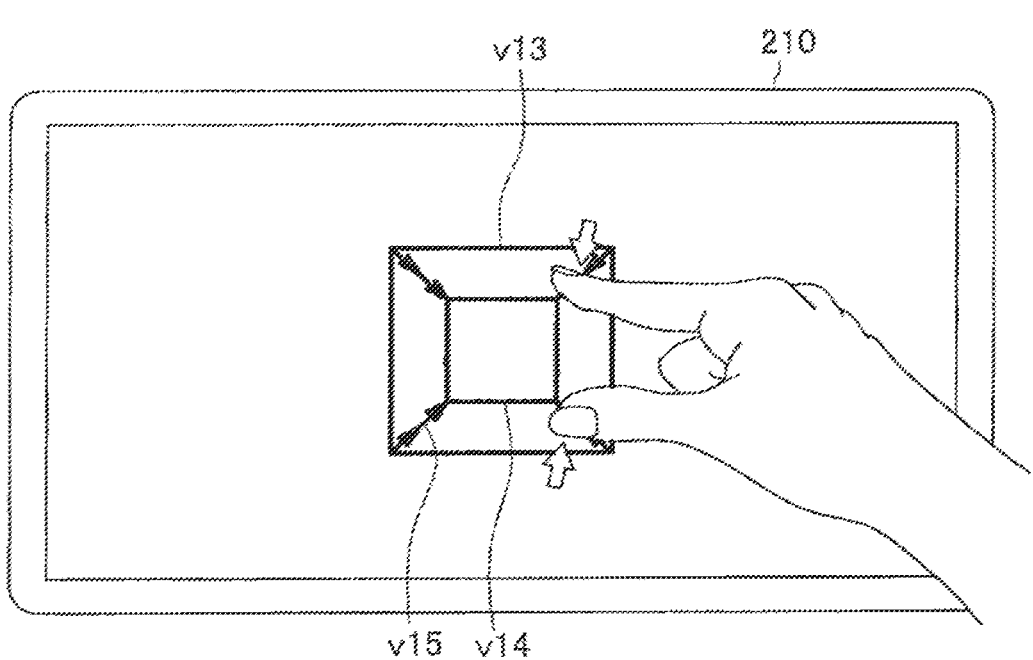
Figure 22:
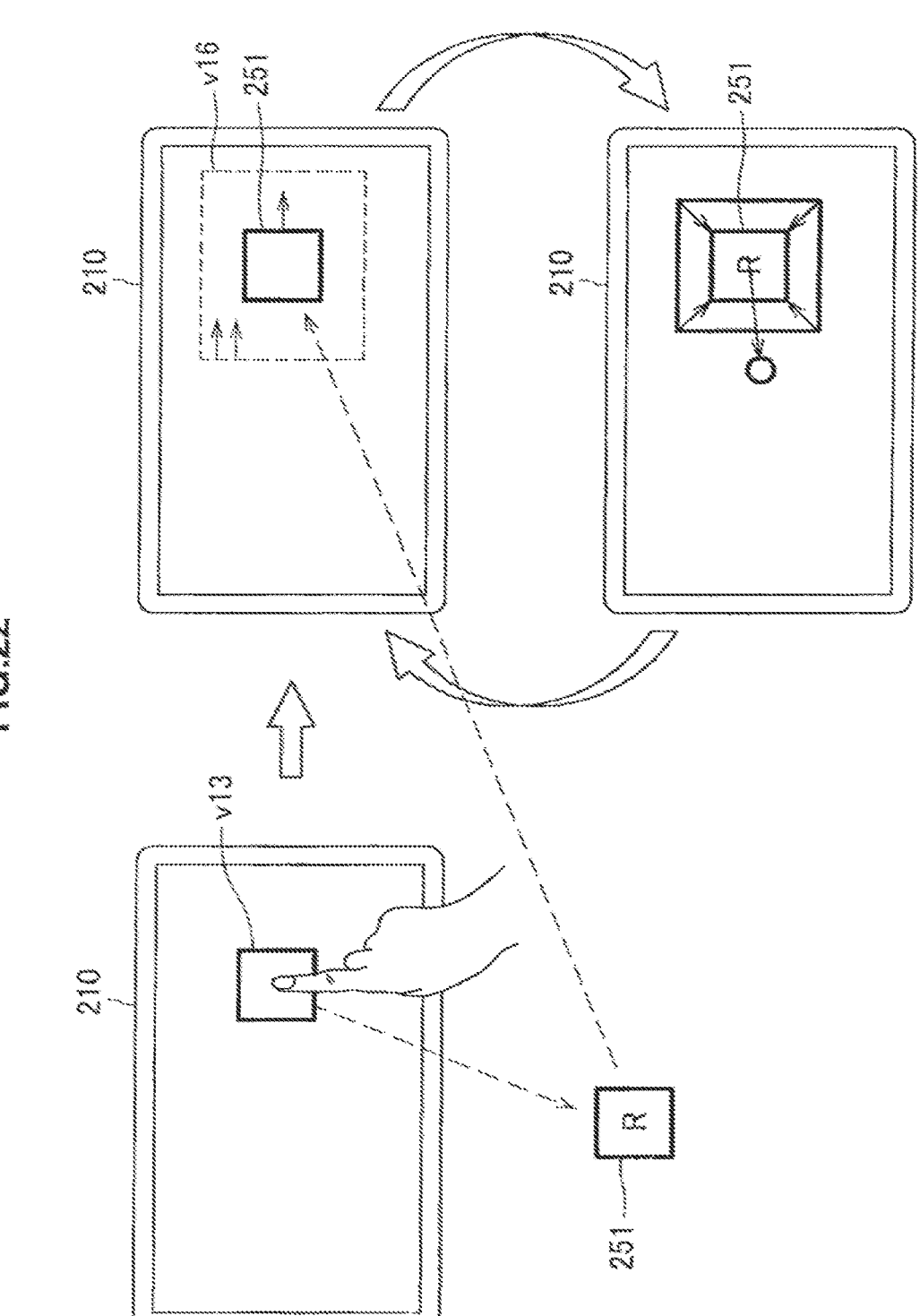
Figure 23:
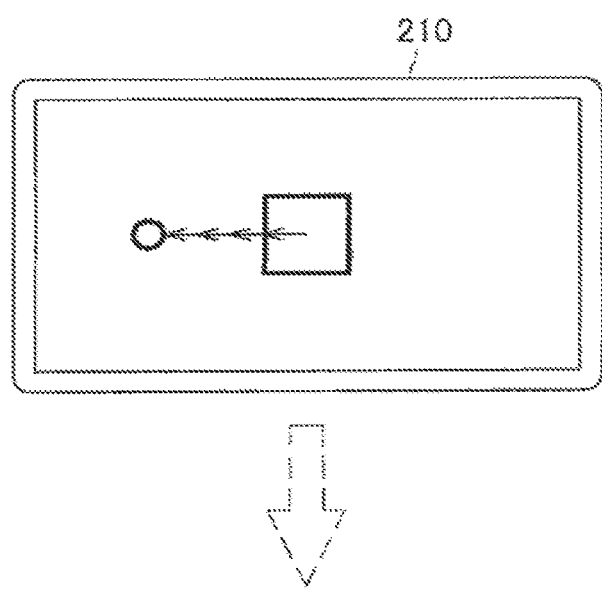
Figure 23:
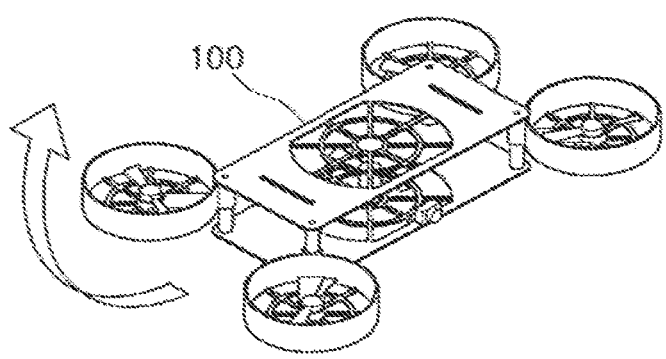
Figure 24:
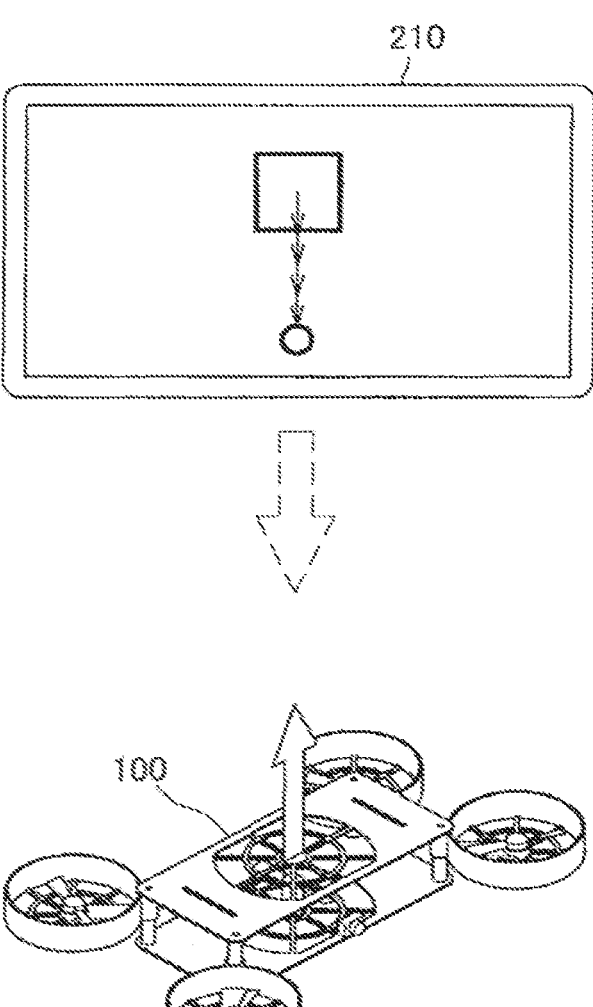
Figure 25:
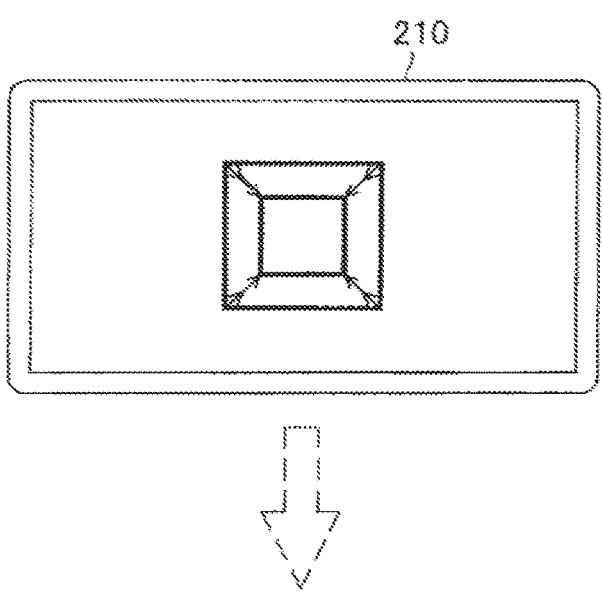
Figure 25:
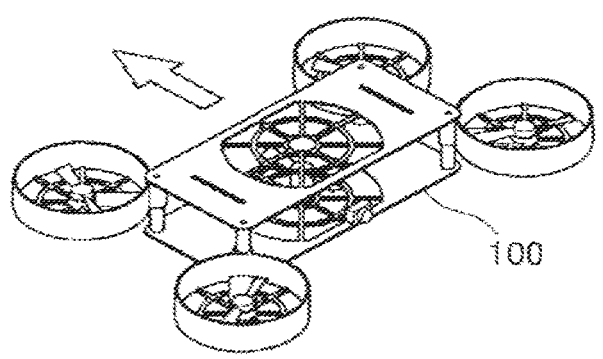
Figure 26:
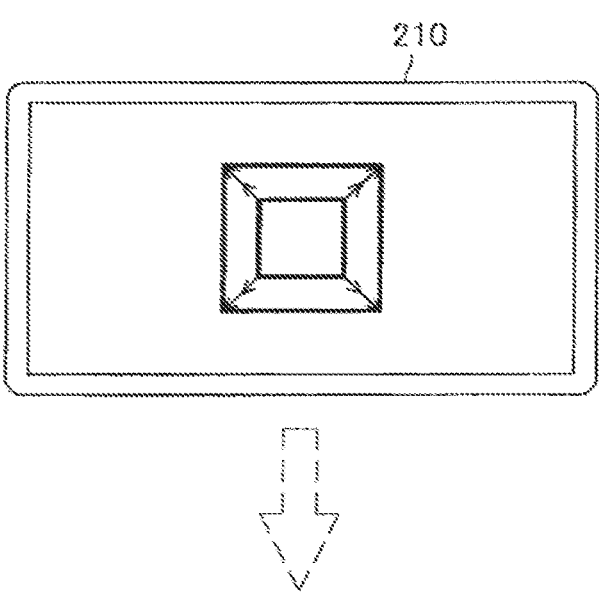
Figure 26:
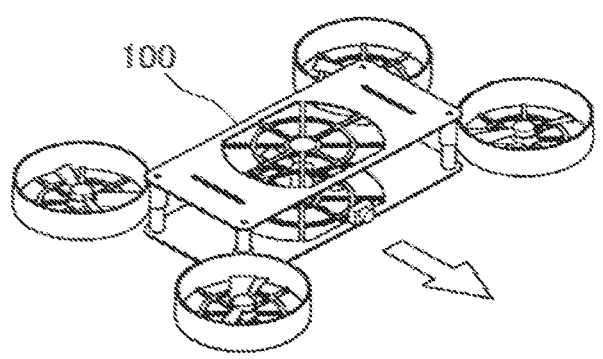
Figure 27:
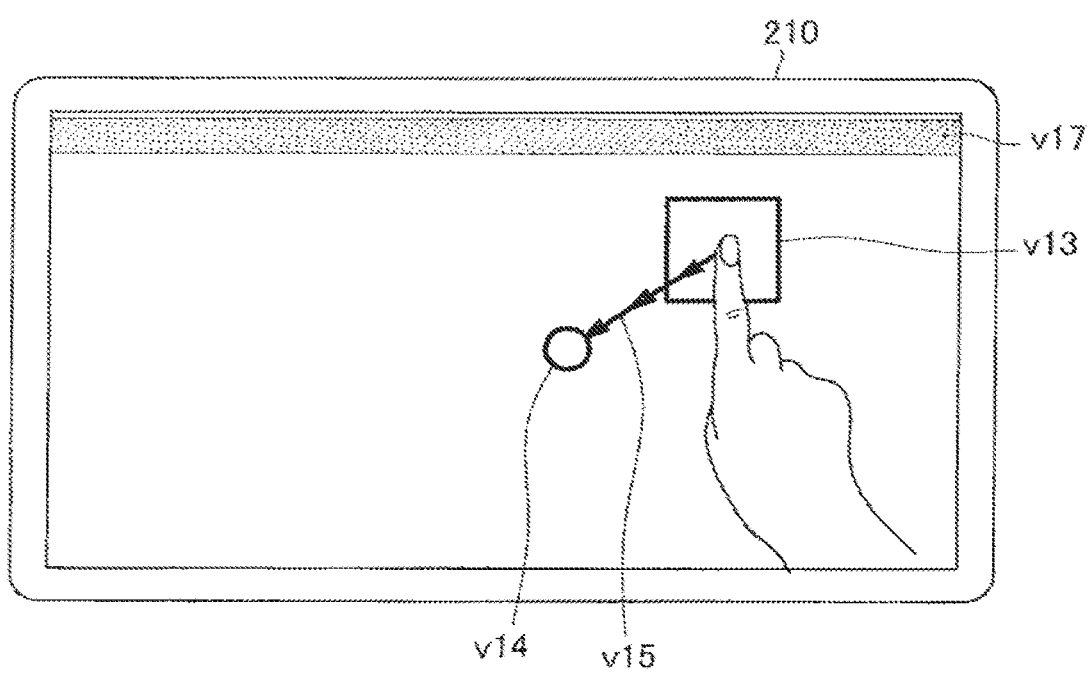
Figure 28:
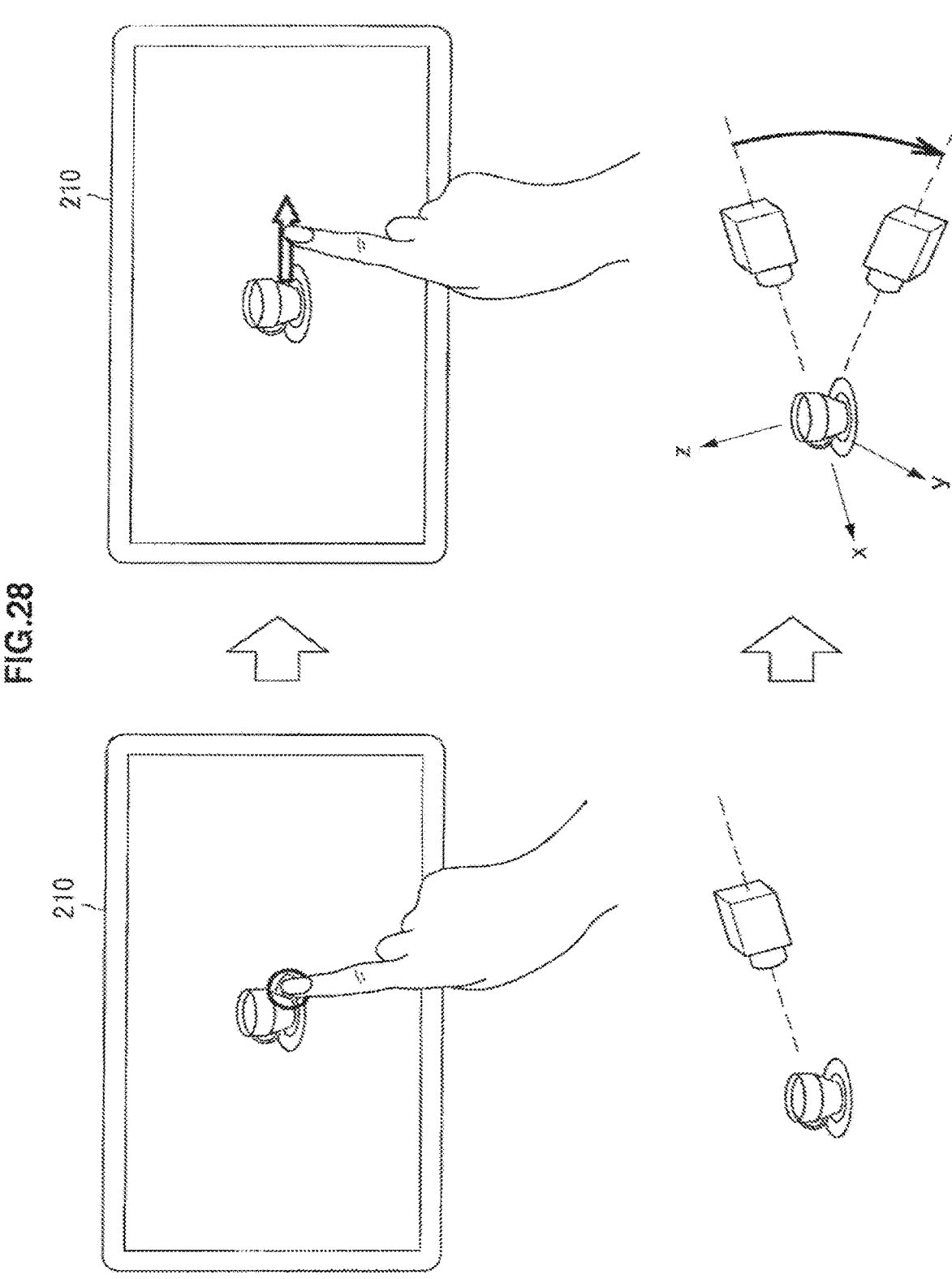
Figure 29:
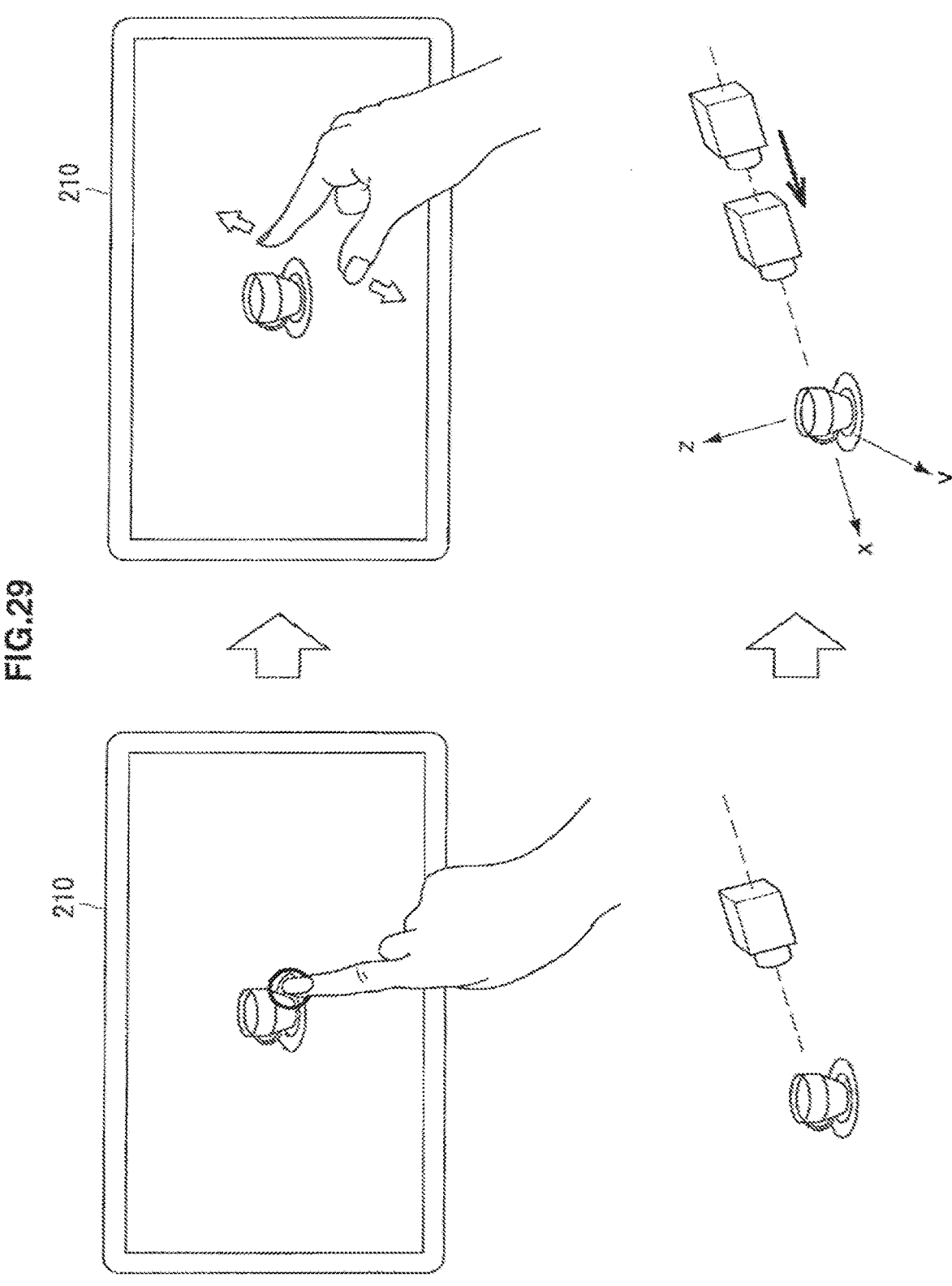
Figure 30:
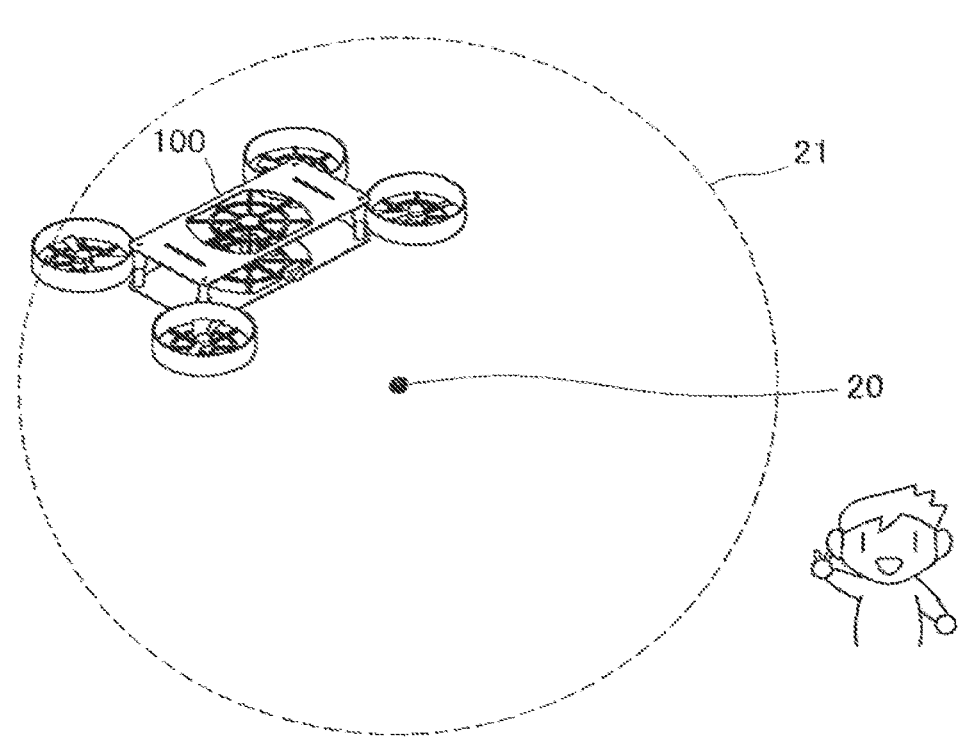
Figure 31:
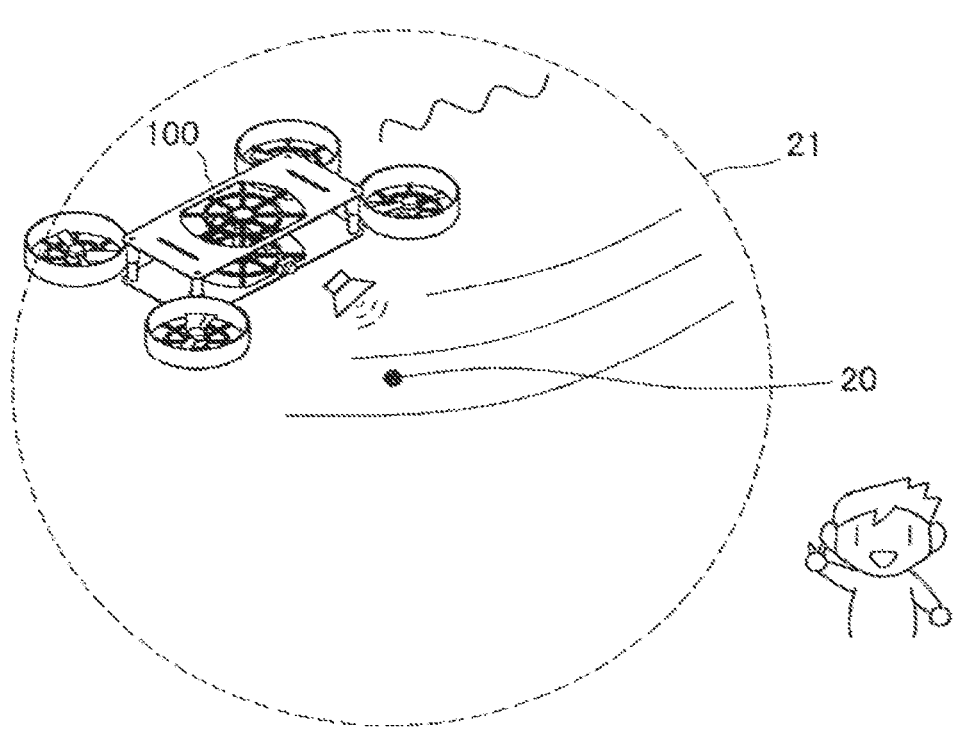
Figure 32:
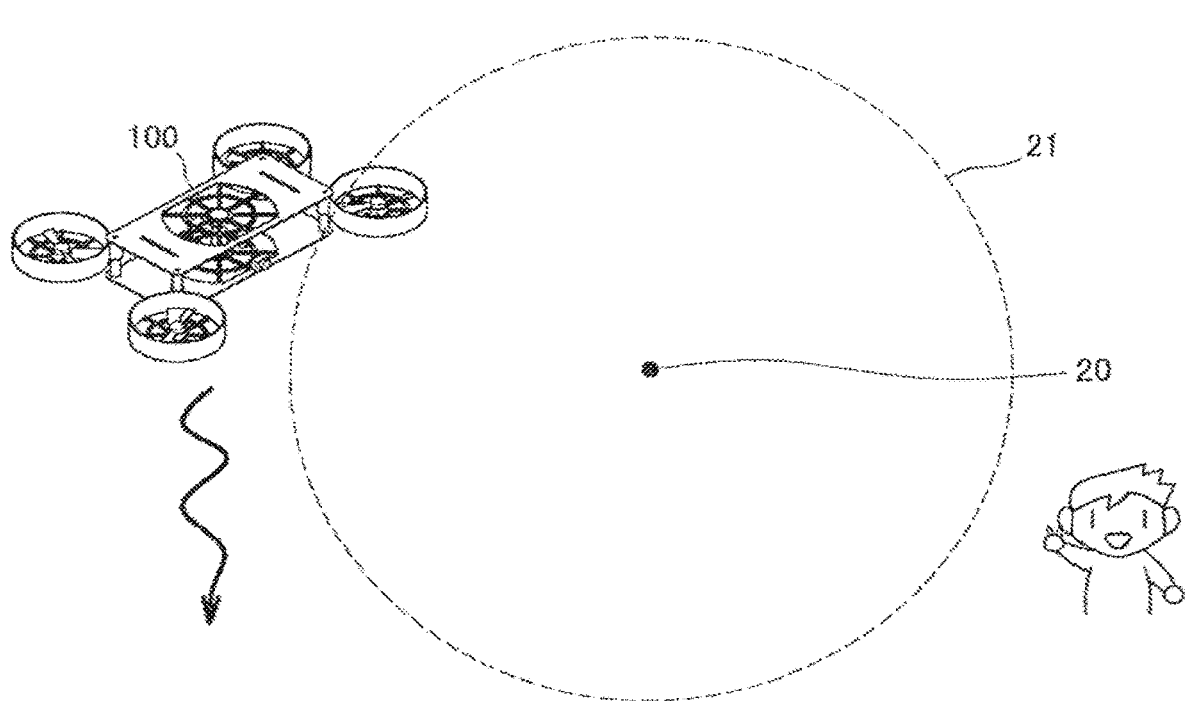
Figure 33:
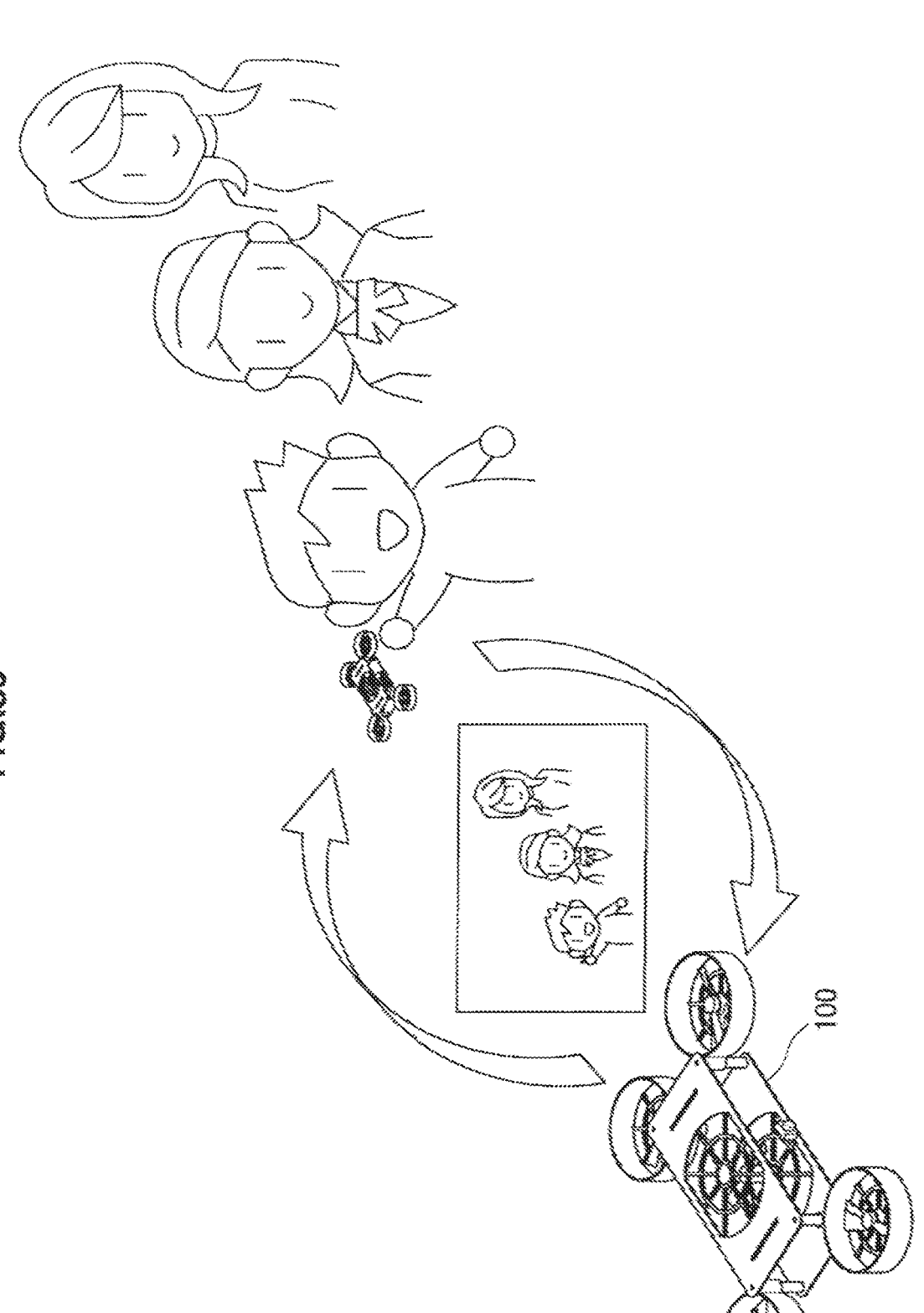
Figure 34:
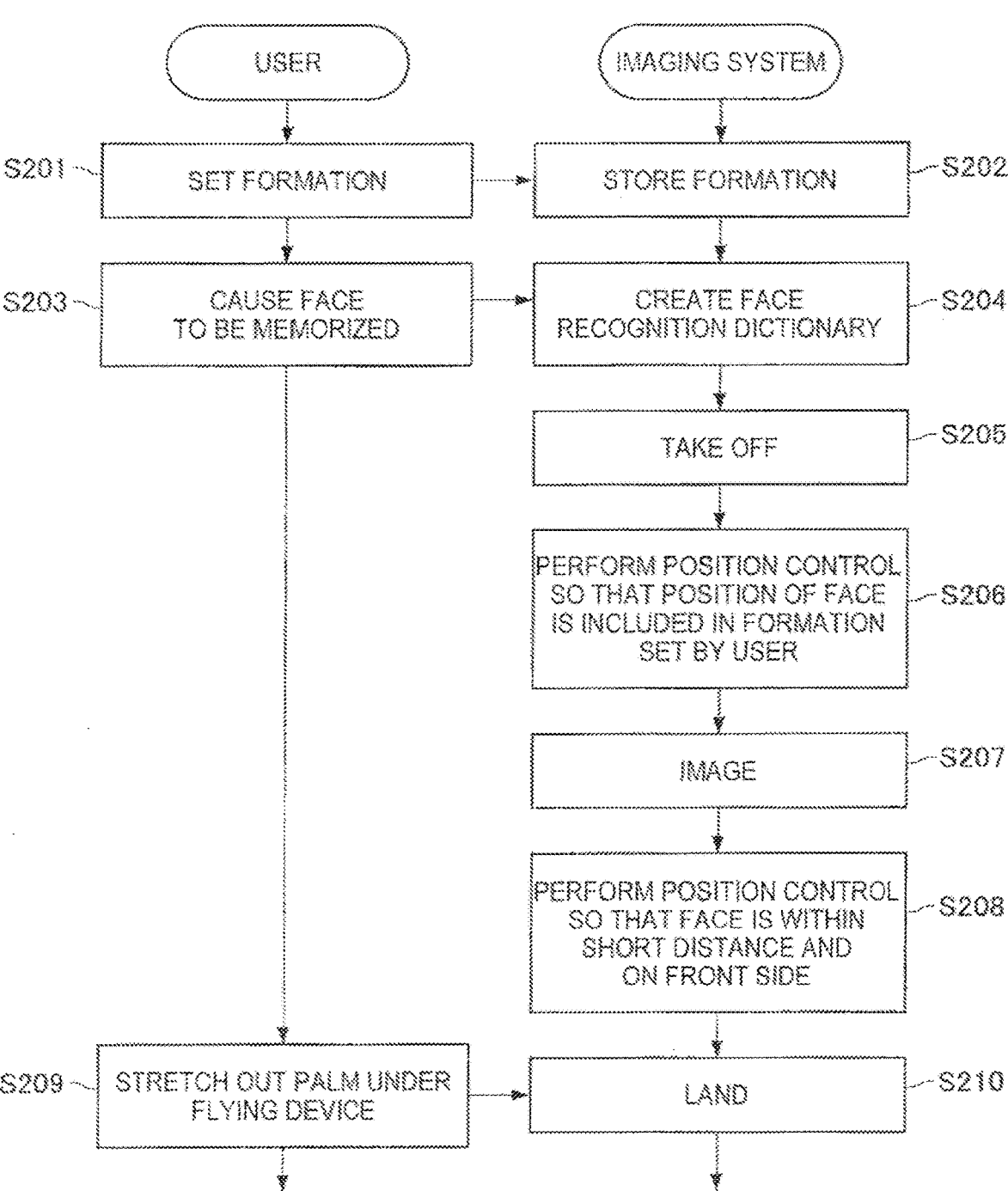
Figure 35:
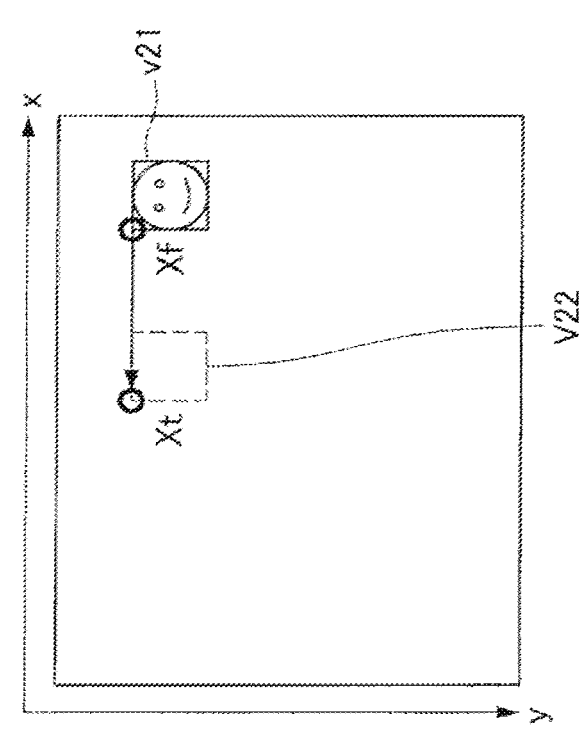
Figure 35:
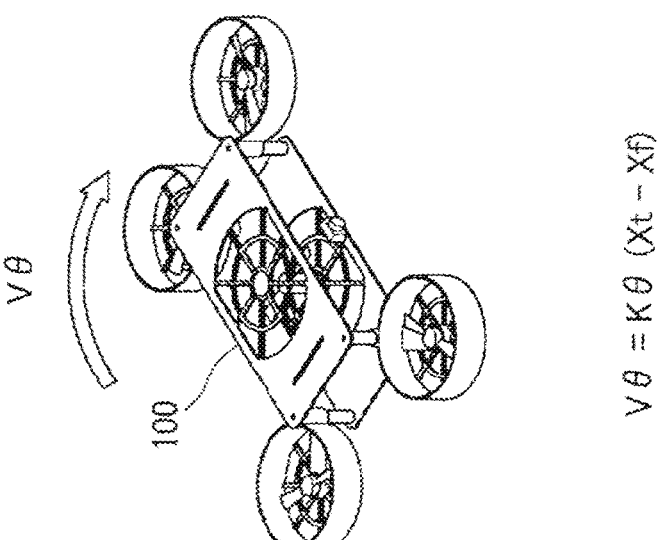
Figure 36:
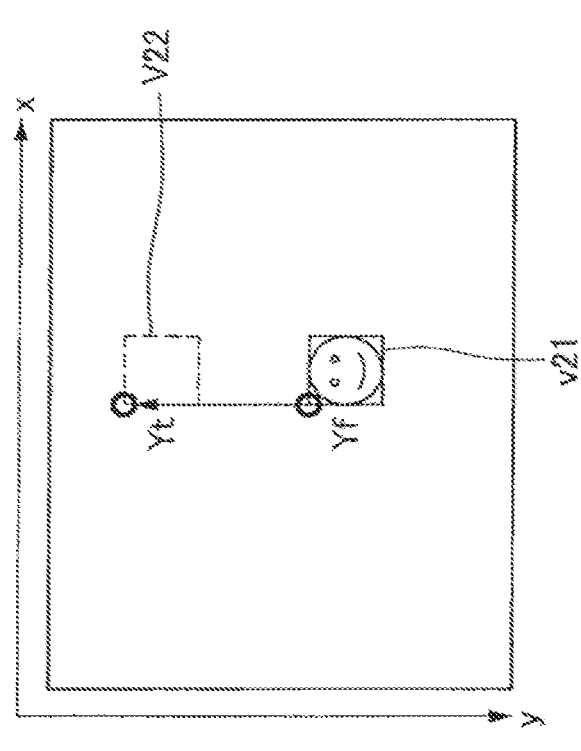
Figure 36:
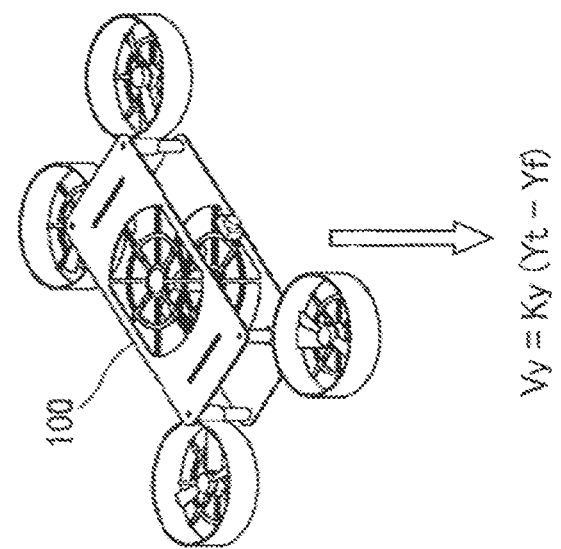
Figure 37:
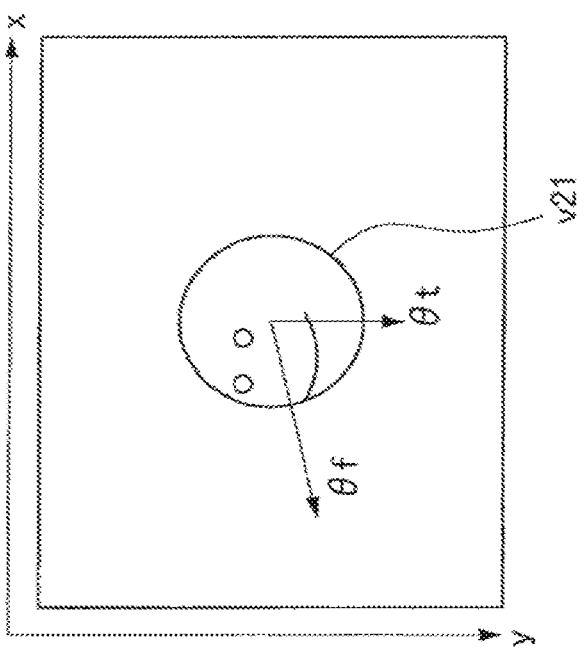
Figure 37:
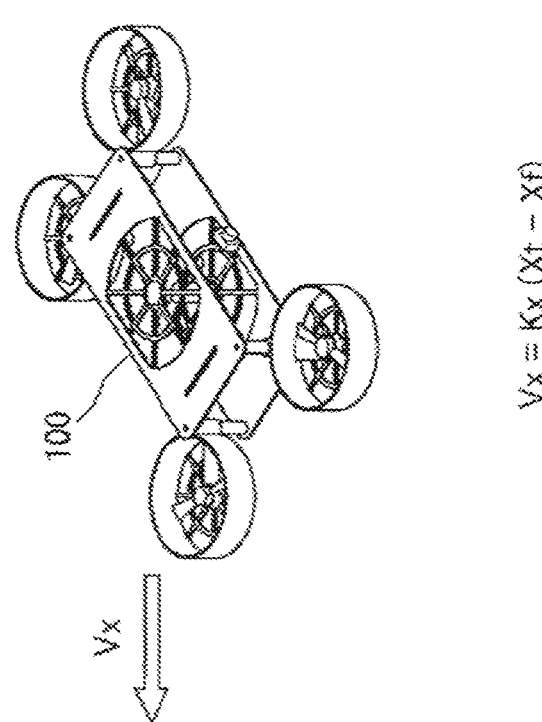
Figure 38:
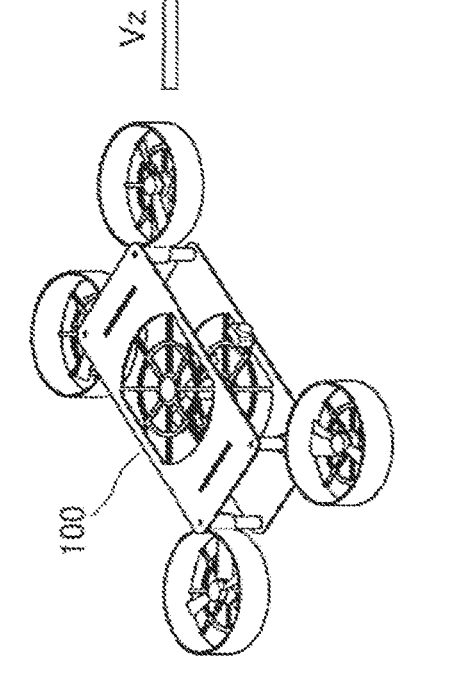

FIG. 15 is a descriptive diagram showing an example of information displayed on a display unit 210 of the controller 200 according to the embodiment of the present disclosure;

FIG. 16 is a descriptive diagram showing an example of information displayed on a display unit 210 of the controller 200 according to the embodiment of the present disclosure;

FIG. 17 is an information display example of the display unit 210 when a user wants to set a position designated using tapping at the center of an image;

FIG. 18 is an information display example of the display unit 210 when a user wants to set a position designated using tapping at the center of an image;

FIG. 19 is an illustrative diagram showing a state in which a user executes a drag operation on the display unit 210;

FIG. 20 is an illustrative diagram showing a state after a user executes the drag operation on the display unit 210;

FIG. 21 is an illustrative diagram showing a state in which a user executes a pinch operation on the display unit 210;

FIG. 22 is an illustrative diagram showing control of flight of the flying device 100 using image feedback;

FIG. 23 is an illustrative diagram showing an example of the correspondence relationship between a user operation performed with respect to an image captured by an imaging device 101 and a movement of the flying device 100;

FIG. 24 is an illustrative diagram showing an example of the correspondence relationship between a user operation performed with respect to an image captured by an imaging device 101 and a movement of the flying device 100;

FIG. 25 is an illustrative diagram showing an example of the correspondence relationship between a user operation performed with respect to an image captured by an imaging device 101 and a movement of the flying device 100;

FIG. 26 is an illustrative diagram showing an example of the correspondence relationship between a user operation performed with respect to an image captured by an imaging device 101 and a movement of the flying device 100;

FIG. 27 is an illustrative diagram showing an example of information displayed on the display unit 210 of the controller 200;

FIG. 28 is an illustrative diagram showing an example of the correspondence relationship between a user operation performed with respect to an image captured by the imaging device 101 and a movement of the flying device 100;

FIG. 29 is an illustrative diagram showing another example of the correspondence relationship between a user operation performed with respect to an image captured by the imaging device 101 and a movement of the flying device 100;

FIG. 30 is an illustrative diagram showing a state of the flying device 100 positioned inside a predetermined flight range 21 that has an initial position 20 as the center thereof;

FIG. 31 is an illustrative diagram showing a state of the flying device 100 attempting to fly beyond the predetermined flight range 21 that has the initial position 20 as the center thereof;

FIG. 32 is an illustrative diagram showing a state of the flying device 100 attempting automatic landing;

FIG. 33 is an illustrative diagram showing an overview of an operation of the flying device 100;

FIG. 34 is a flowchart showing an operation example of the imaging system 10 according to the embodiment of the present disclosure;

FIG. 35 is an illustrative diagram showing a control example of a position and an attitude of the flying device 100 based on image recognition;

FIG. 36 is an illustrative diagram showing a control example of a position and an attitude of the flying device 100 based on image recognition;

FIG. 37 is an illustrative diagram showing a control example of a position and an attitude of the flying device 100 based on image recognition; and FIG. 38 is an illustrative diagram showing a control example of a position and an attitude of the flying device 100 based on image recognition.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

<1. Embodiment of the present disclosure>
[Exterior example of an imaging system]
[Functional configuration example of an imaging system]
[Operation example of a flying device and controller]
[2. Conclusion]

1. EMBODIMENT OF THE PRESENT DISCLOSURE

[Exterior Example of an Imaging System]

Figure 1:
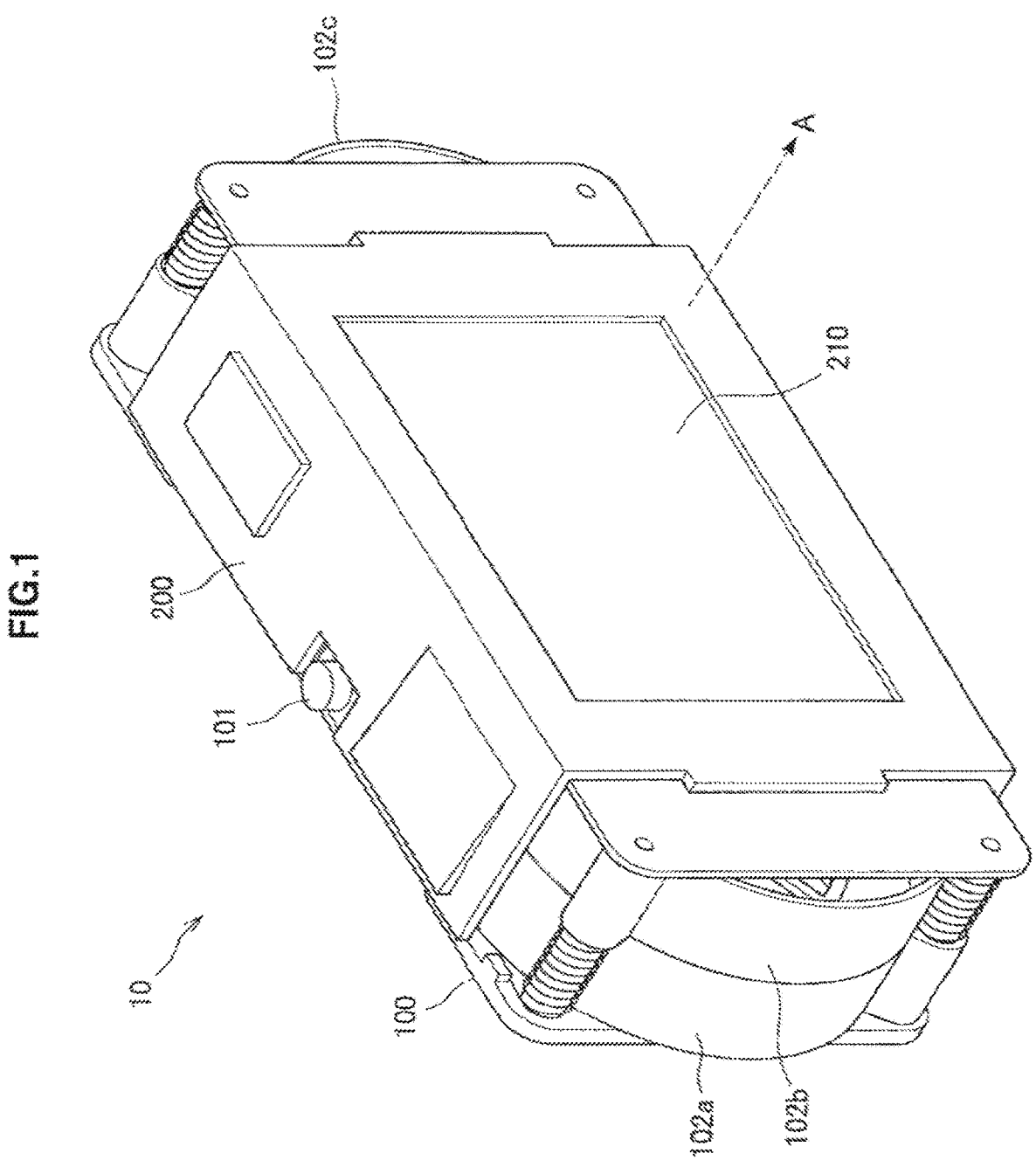
FIG. 1 is an illustrative diagram showing an exterior example of an imaging system according to an embodiment of the present disclosure.
Figure 2:
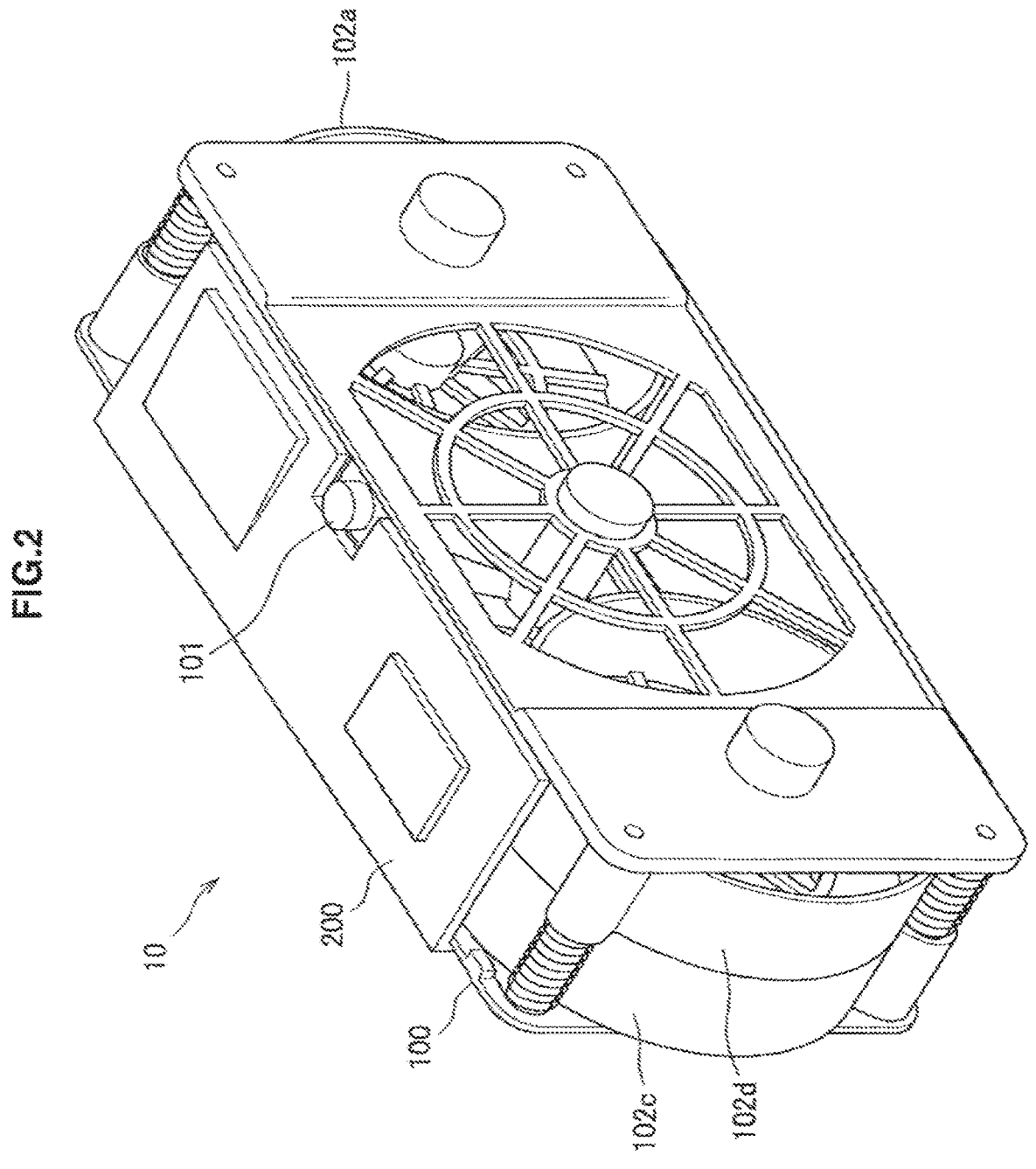
FIG. 2 is an illustrative diagram showing an exterior example of an imaging system according to an embodiment of the present disclosure.
Figure 3:
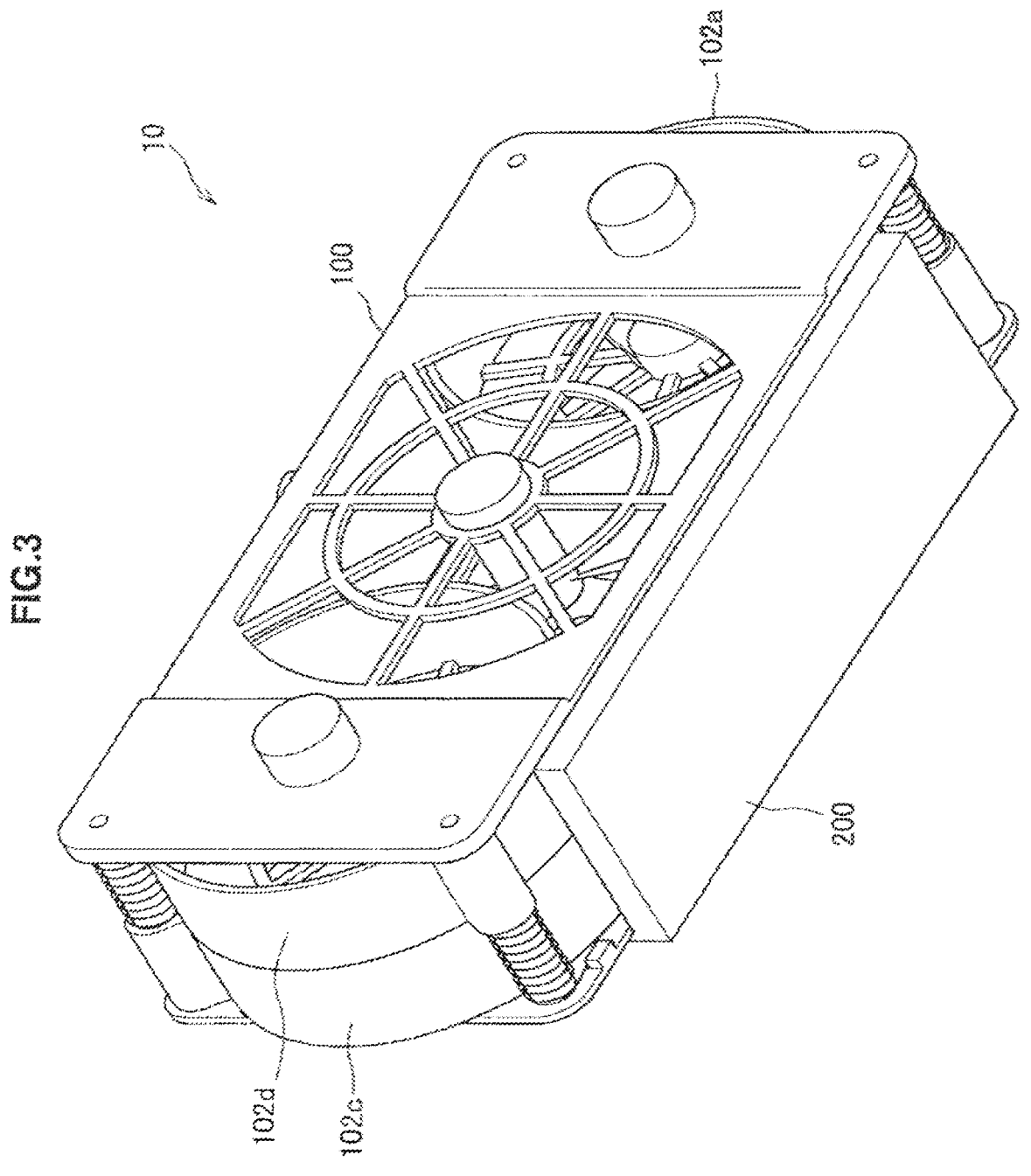
FIG. 3 is an illustrative diagram showing an exterior example of an imaging system according to an embodiment of the present disclosure.

First, an exterior example of an imaging system according to an embodiment of the present disclosure will be described with reference to the drawings. FIGS. 1 to 3 are illustrative diagrams showing an exterior example of the imaging system according to the embodiment of the present technology. Hereinafter, the exterior example the imaging system according to the embodiment of the present disclosure will be described using FIGS. 1 to 3.

The drawing of FIG. 1 show an illustrative diagram showing the exterior example of the imaging system 10 according to the embodiment of the present disclosure in a perspective view, and the drawing shown in FIG. 2 is an illustrative diagram showing the exterior example of the imaging system 10 according to the embodiment of the present disclosure in a perspective view taken from the opposite side of the perspective view shown in FIG. 1. In addition, the drawing shown in FIG. 3 is an illustrative diagram showing the exterior example of the imaging system 10 according to the embodiment of the present disclosure in a perspective view taken from below.

The imaging system 10 according to the embodiment of the present disclosure is configured to include a flying device 100 and a controller 200 that controls the flying device 100. The flying device 100 can fly by rotating rotors under the control of the controller 200. However, when the flying device 100 does not fly, the controller 200 is configured to be able to accommodate the rotors therein as shown in FIGS. 1 to 3.

The flying device 100 shown in FIGS. 1 to 3 can fly using four rotors. In FIGS. 1 to 3, rotor covers 102*a* to 102*d* protecting each of the rotors are shown. The imaging system 10 according to the embodiment of the present disclosure can accommodate the rotor covers 102*a* to 102*d* inside the controller 200 as shown in FIGS. 1 to 3 when the flying device 100 does not fly.

The imaging system 10 according to the embodiment of the present disclosure is configured such that the controller 200 is slidable in the direction of A of FIG. 1. The imaging system 10 according to the embodiment of the present disclosure is configured such that the controller 200 is detached from the flying device 100 when the controller 200 is slid in the direction of A of FIG. 1.

The flying device 100 includes an imaging device 101 that captures still images or moving images. The imaging device 101 is constituted by a lens, an image sensor such as a CCD (Charge Coupled Device) image sensor or a CMOS (Complementary Metal Oxide Semiconductor) image sensor, and the like. The imaging device 101 included in the flying device 100 executes capturing of still images or moving images under the control of the controller 200, and provides the captured images to the controller 200.

The controller 200 controls a flight state of the flying device 100 and capturing of images by the imaging device 101 included in the flying device 100. The controller 200 performs control of the flight state and images through wireless communication. As shown in FIG. 1, the controller 200 includes a display unit 210. A functional configuration of the controller 200 for controlling the flight state of the flying device 100 and capturing of images by the imaging device 101 included in the flying device 100 will be described later in detail.

The display unit 210 is configured as, for example, a flat display device such as a liquid crystal display device, or an organic EL display device, and can display images captured by the imaging device 101 and information for controlling operations of the flying device 100. The display unit 210 includes a touch panel, and a user can perform a direct operation with respect to information displayed on the display unit 210 by touching the display unit 210 with a finger, or the like.

So far, the exterior example of the imaging system 10 according to the embodiment of the present disclosure has been described using FIGS. 1 to 3. Next, an exterior example of the flying device 100 will be described in more detail.

Figure 4:
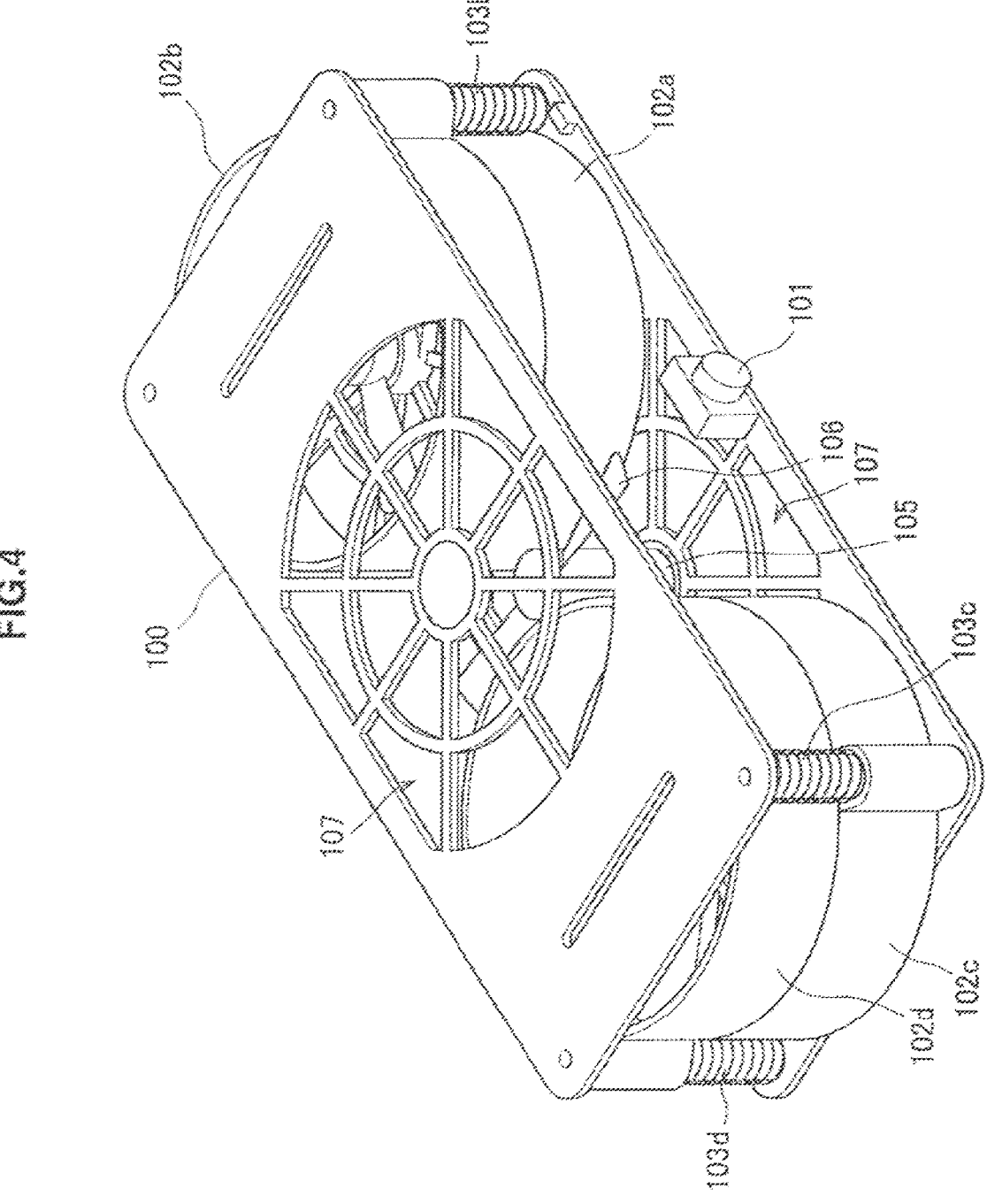
FIG. 4 is an illustrative diagram showing an exterior example of a flying device 100 constituting the imaging system 10 according to the embodiment of the present disclosure.

FIG. 4 is an illustrative diagram showing an exterior example of the flying device 100 constituting the imaging system 10 according to the embodiment of the present disclosure. Hereinafter, the exterior example of the flying device 100 will be described using FIG. 4.

FIG. 4 shows a state of the imaging system 10 according to the embodiment of the present disclosure shown in FIG. 1 from which the controller 200 is detached. FIG. 4 shows spring parts 103a to 103d in addition to the imaging device 101 and the rotor covers 102a to 102d shown in FIGS. 1 to 3. Each of the spring parts 103a to 103d is wound around struts in the four corners of the flying device 100, and causes the rotor covers 102a to 102d to rotate using the struts as axes.

The drawing of FIG. 4 shows a state in which the rotor covers 102a to 102d are accommodated inside the flying device 100 by a user. The imaging system 10 according to the embodiment of the present disclosure has the form as shown in FIGS. 1 to 3 when the controller 200 covers the flying device 100 in the state of the form of the flying device 100 shown in FIG. 4. When the controller 200 covers the flying device 100, the controller 200 suppresses turning of the rotor covers 102a to 102d.

FIG. 4 shows a strut 105 provided at the center of the flying device 100, a rotor 106 provided in the strut 105, and a plurality of vent holes 107. The rotor 106 performs rotational motions using the strut 105 as an axis under the control of the controller 200. In addition, the vent holes 107 can be provided to correspond to a range of the rotational motions of the rotor 106. Since the flying device 100 has the rotor 106, a lift force can increase due to the rotational motions of the rotor 106 even when it is difficult to obtain a sufficient lift force only from rotational motions of the rotors protected by the rotor covers 102a to 102d.

Figure 5:
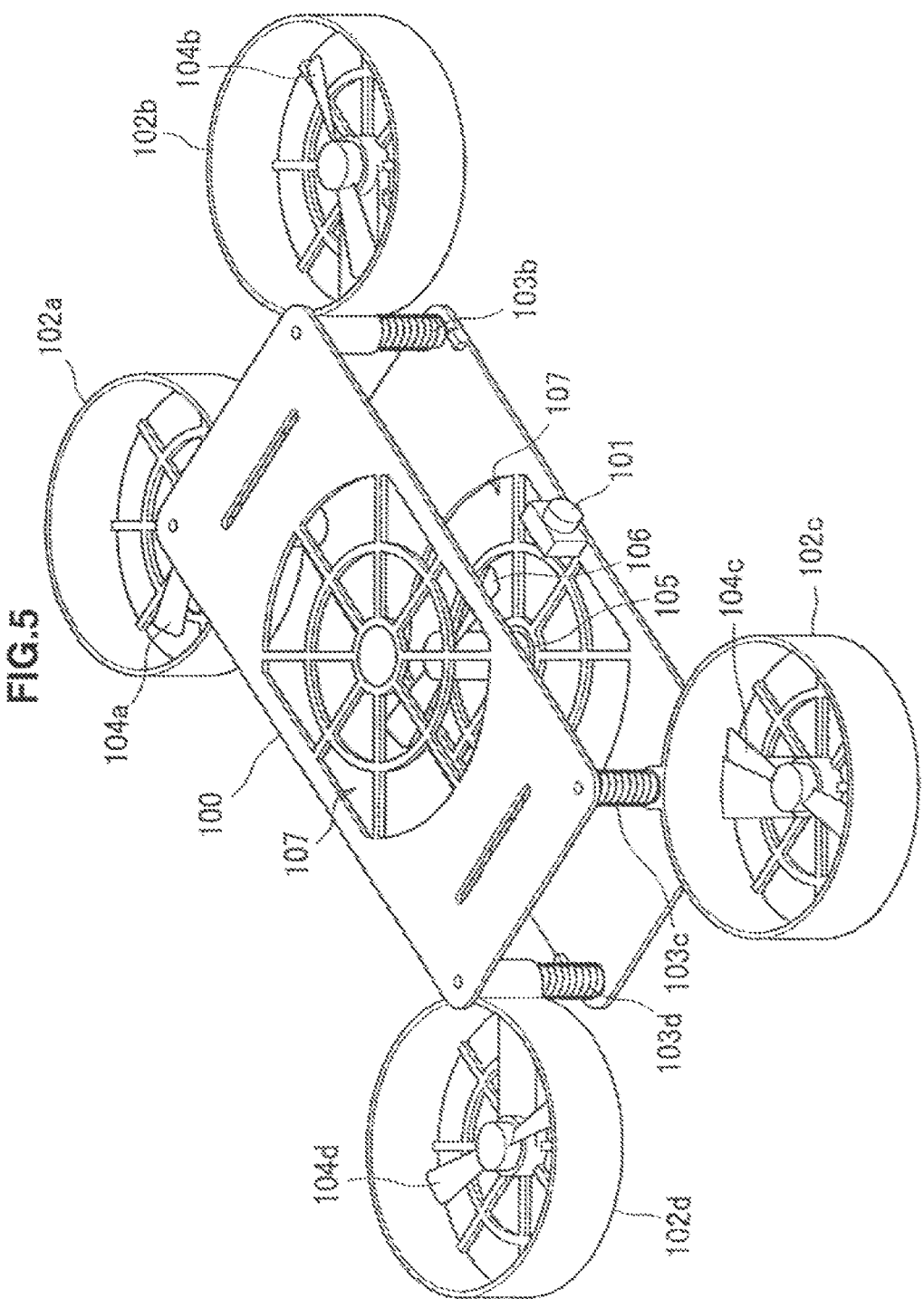
FIG. 5 is an illustrative diagram showing an exterior example of a flying device 100 constituting the imaging system 10 according to the embodiment of the present disclosure.

FIG. 5 is an illustrative diagram showing an exterior example of the flying device 100 constituting the imaging system 10 according to the embodiment of the present disclosure. The drawing of FIG. 5 shows the state in which the controller 200 is detached by sliding the controller 200 in the direction of A of FIG. 1 from the state shown in FIG. 1. When the controller 200 is slid in the direction of A of FIG. 1 from the state shown in FIG. 1 and then the controller 200 is detached, the rotor covers 102a to 102d of which turning has been suppressed by the controller 200 turn as shown in FIG. 5 due to actions of the spring parts 103a to 103d.

FIG. 5 shows the rotors 104a to 104d protected by the rotor covers 102a to 102d. The rotors 104a to 104d cause the flying device 100 to rise by independently performing rotational motions according to control of the controller 200.

In the flying device 100, the rotors 104a to 104d protected by the rotor covers 102a to 102d are provided with a predetermined difference in level as shown in FIGS. 4 and 5. By providing the rotors 104a to 104d with the predetermined difference in level in this manner, the flying device 100 can compactly accommodate the rotors 104a to 104d when the rotors should be accommodated therein.

Since an existing flying device has a unit that outputs a thrust force fixed thereto, portability thereof is impaired. Since the flying device 100 constituting the imaging system 10 according to the embodiment of the present disclosure is configured to be able to accommodate the rotors 104a to 104d therein as shown in FIGS. 4 and 5, portability thereof can be remarkably improved.

In addition, since the rotor covers 102a to 102d turn such that the rotor covers pop up out of the flying device 100 in the state in which the controller 200 is detached from the flying device 100, the distances between the center of gravity and the centers of the rotors 104a to 104d can be lengthened in comparison to the state in which the rotor covers 102a to 102d are accommodated, and an attitude during flight of the flying device 100 can be stabilized.

Herein, the principle of flight of the flying device 100 will be described. With respect to the flying device 100, operations of levitation, movement, stand-still, landing, and the like using the rotors 104a to 104d of which rotation speeds are independently controllable are possible. The rotation direction of the rotors 104a and 104c is exactly opposite to the rotation direction of the rotors 104b and 104d, and if all rotors are rotated at a uniform speed by setting the rotation direction of the rotors 104a and 104c to be exactly opposite to the rotation direction of the rotors 104b and 104d, the flying device 100 ascends or descends.

In addition, for example, when a rotation speed of the rotors 104a and 104b is lower than a rotation speed of the rotors 104c and 104d in the state in which the flying device 100 is ascending, the flying device 100 can move in the direction of the rotors 104a and 104b in the ascending state. In addition, for example, when a rotation speed of the rotors 104a and 104c is lower than a rotation speed of the rotors 104b and 104d in the state in which the flying device 100 is ascending, the flying device 100 can rotate clockwise or counterclockwise in the horizontal direction in the ascending state.

In this manner, by appropriately changing rotation speeds of the rotors 104a to 104d, operations of the flying device 100 including lifting, horizontal movement, stand-still, landing and the like can be performed. In addition, in the present embodiment, such control of movements of the flying device 100 using changes of the rotation speed of the rotors 104a to 104d can be performed by an operation with respect to images captured by the imaging device 101, rather than a manipulation with respect to the flying device 100.

In this manner, a position and attitude of the flying device 100 can be freely changed by controlling the rotation speed of the rotors 104a to 104d, but it is desirable to ascertain a position of the device itself and a relative position with respect to an imaging target in an environment in order to perform imaging using the imaging device 101, in addition to control of the rotation speeds of the rotors 104a to 104d.

Methods for ascertaining a position of the device itself and a relative position with respect to an imaging target in an environment include, for example, a method in which an acceleration sensor, a gyro sensor, or other inertial sensor is used, a method in which a position of the device is estimated by itself based on movement amounts of a plurality of target points by recognizing a feature point or an object in an environment using an image sensor and the like.

For example, a current position and attitude can be obtained from a change amount of a position and an attitude by measuring an acceleration and angular velocity of the device itself using an inertial sensor such as an acceleration sensor or a gyro sensor. Furthermore, a position and attitude of the device itself can be obtained while an error caused by an integration of the change amount is corrected by measuring the absolute amount of a direction, an altitude, and the like using a pneumatic sensor.

In addition, for example, a position of the device itself can be estimated based on a movement amount of a plurality of target points by recognizing a feature point or an object in an environment using an image sensor, or the like. This technique is called SLAM (Simultaneous Localization And Mapping). By using SLAM in accordance with a movement amount obtained from the inertial sensor described above when SLAM should be used, position recognition accuracy can be increased.

With such control, the flying device 100 can properly ascertain its position under an environment in which the flying device attempts to perform imaging, and can automatically perform a movement to a proper position and stand-still with feedback control.

Note that, although the case in which four rotors are provided has been described in the above-described example, except for the rotor 106 provided at the center of the flying device 100, the number of rotors is not limited to the example. For example, the flying device may have eight rotors.

Figure 6:
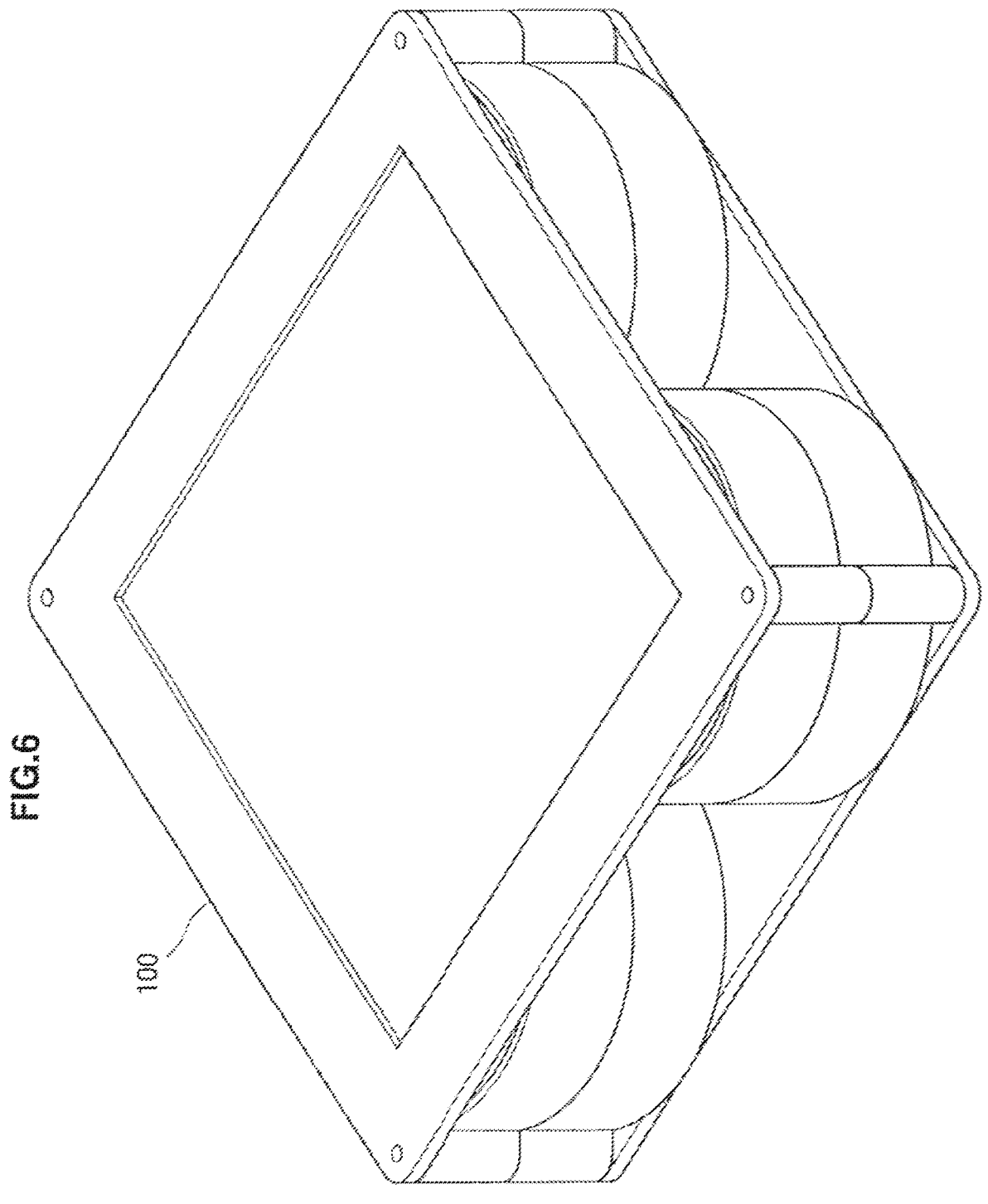
FIG. 6 is an illustrative diagram showing a modified example of the flying device according to the embodiment of the present disclosure.
Figure 7:
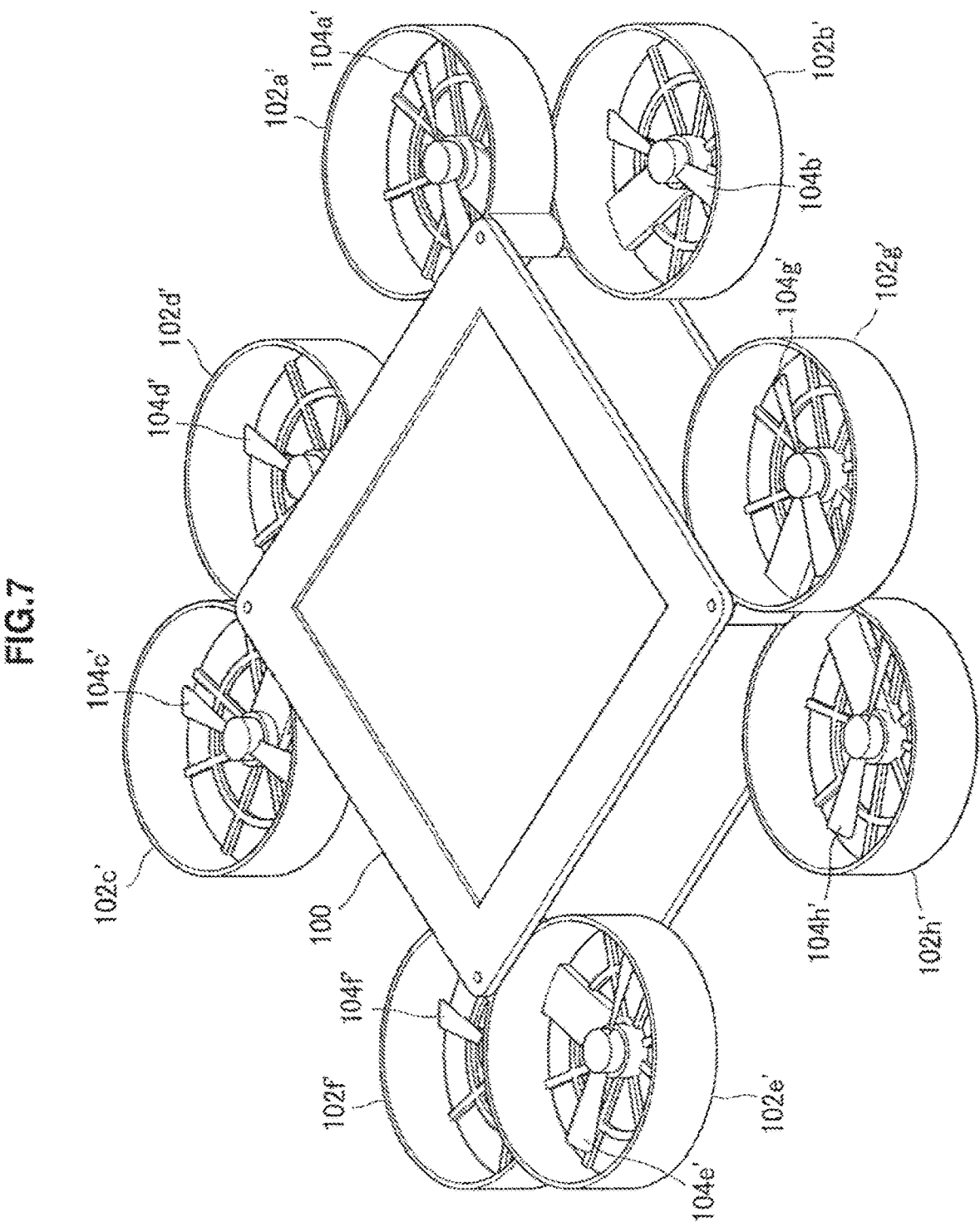
FIG. 7 is an illustrative diagram showing a modified example of the flying device according to the embodiment of the present disclosure.

FIGS. 6 and 7 are illustrative diagrams showing a modified example of the flying device according to the embodiment of the present disclosure. FIGS. 6 and 7 are illustrative diagrams showing an exterior example of the flying device 100 that has eight rotors. In FIGS. 6 and 7, the flying device 100 with rotor covers 102a' to 102h' is shown. The flying device 100 having eight rotors can also be provided as a modified example of the embodiment of the present disclosure as shown in FIGS. 6 and 7.

In the example described above, although the action of the spring parts 103a to 103d causes the rotor covers 102a to 102d to turn, the present disclosure is not limited to the example. For example, a slit may be provided in each strut in which the rotor covers 102a to 102d are provided so that the rotor covers 102a to 102d turn along the slit.

Figure 8:
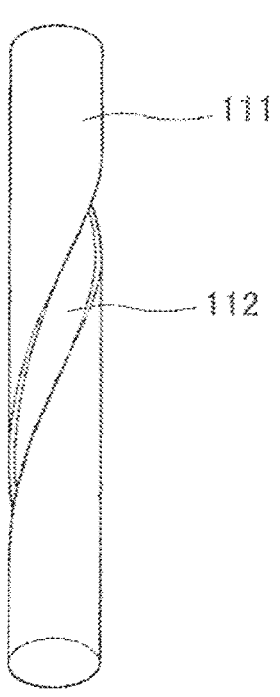
FIG. 8 is an illustrative diagram showing a structure example of a strut 111 that supports rotor covers 102a to 102d.

FIG. 8 is an illustrative diagram showing a structure example of a strut 111 that supports the rotor covers 102a to 102d. The strut 111 shown in FIG. 8 is provided with a slit part 112 that causes the rotor covers 102a to 102d to turn around the strut 111. By causing the rotor covers 102a to 102d to turn along the slit part 112, when the rotor covers 102a to 102d open toward the outside of the flying device 100, all of the rotor covers 102a to 102d can be positioned at the same height.

Figure 9:
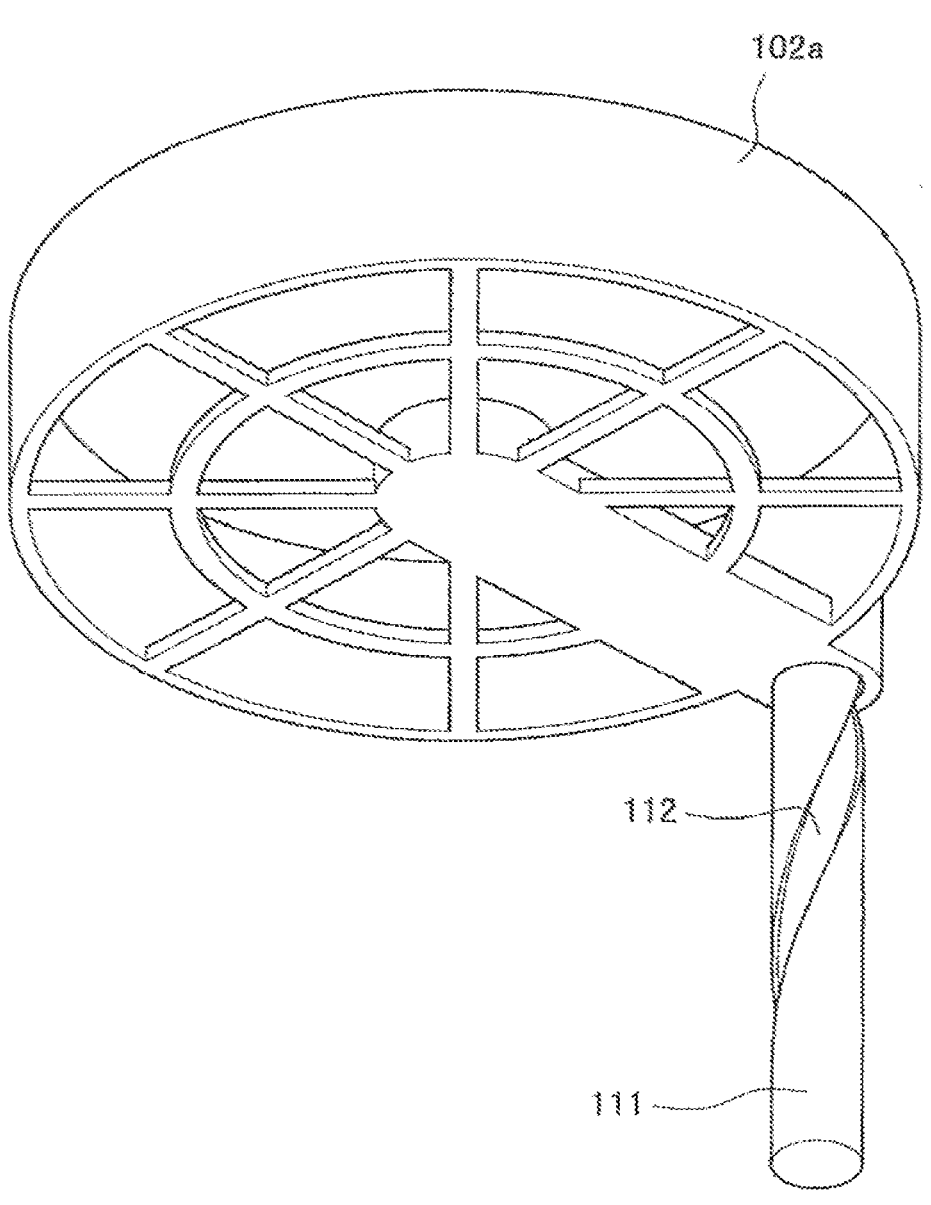
FIG. 9 is an illustrative diagram showing an appearance of the rotor cover 102a turning along a slit part 112 of the strut 111.
Figure 10:
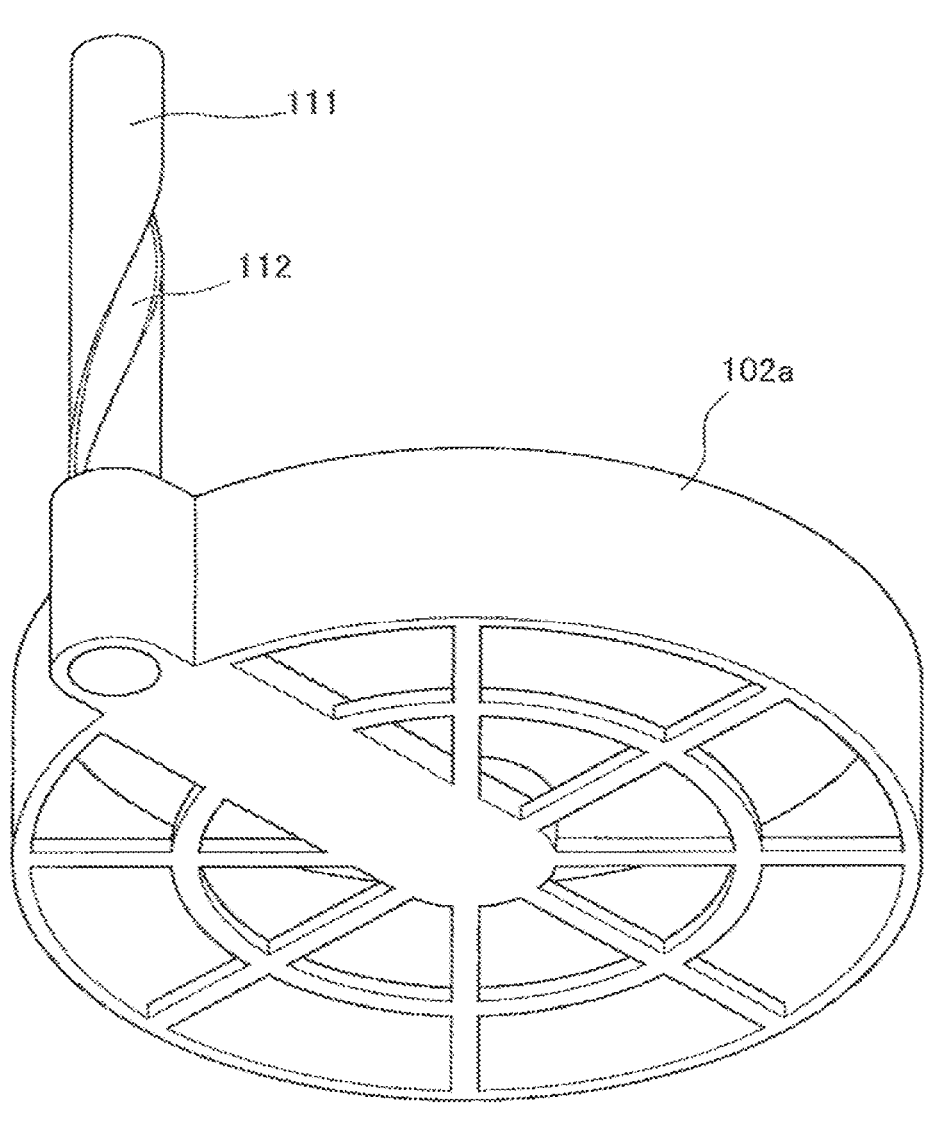
FIG. 10 is an illustrative diagram showing an appearance of the rotor cover 102a turning along a slit part 112 of the strut 111.

FIGS. 9 and 10 are illustrative diagrams showing an appearance of the rotor cover 102a turning along the slit part 112 of the strut 111.

Hereinabove, the exterior example of the flying device 100 has been described using FIGS. 4 and 5. Next, the controller 200 that controls operations of the flying device 100 will be described.

Figure 11:
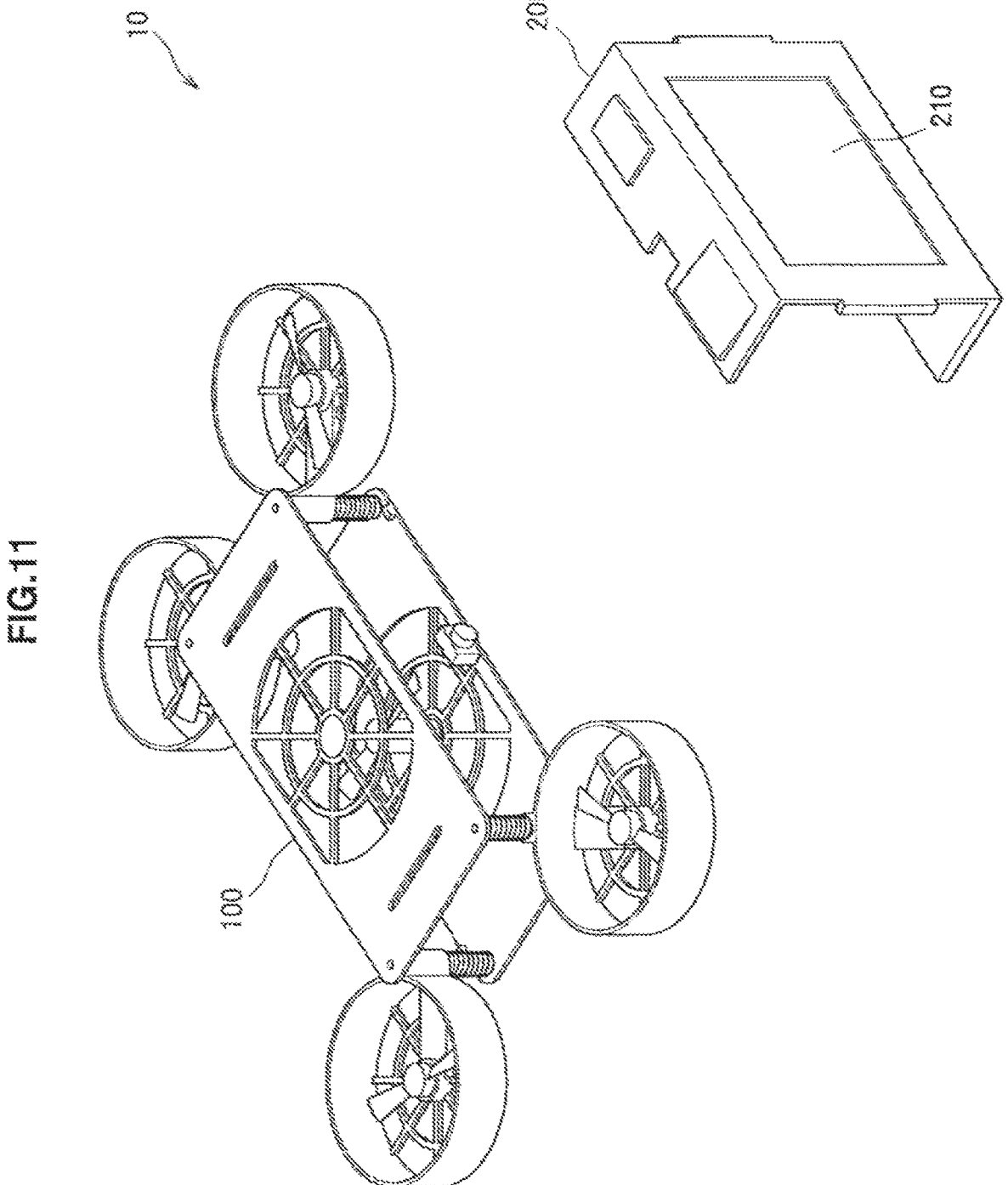
FIG. 11 is an illustrative diagram showing an appearance in which a user controls an operation of the flying device 100 using a controller 200.

FIG. 11 is an illustrative diagram showing an example of an appearance in which a user controls an operation of the flying device 100 using the controller 200. When the controller 200 is detached from the flying device 100, the controller functions as a device that can remotely manipulate the flying device 100 as shown in FIG. 11. When the user uses the controller 200, takeoff, flight, and landing of the flying device 100 can be controlled.

In addition, the imaging system 10 according to the embodiment of the present disclosure can transmit an image captured by the imaging device 101 provided in the flying device 100 to the controller 200 in real time, and can control operations of the flying device 100 by receiving an operation with respect to an image captured by the imaging device 101 and displayed on the display unit 210 of the controller 200. In other words, the user can control operations of the flying device 100 with an operation with respect to an image captured by the imaging device 101, rather than manipulation with respect to the flying device 100.

Hereinabove, the exterior example of the imaging system according to the embodiment of the present disclosure has been described. Next, a functional configuration example of the imaging system according to the embodiment of the present disclosure will be described.

Figure 12:
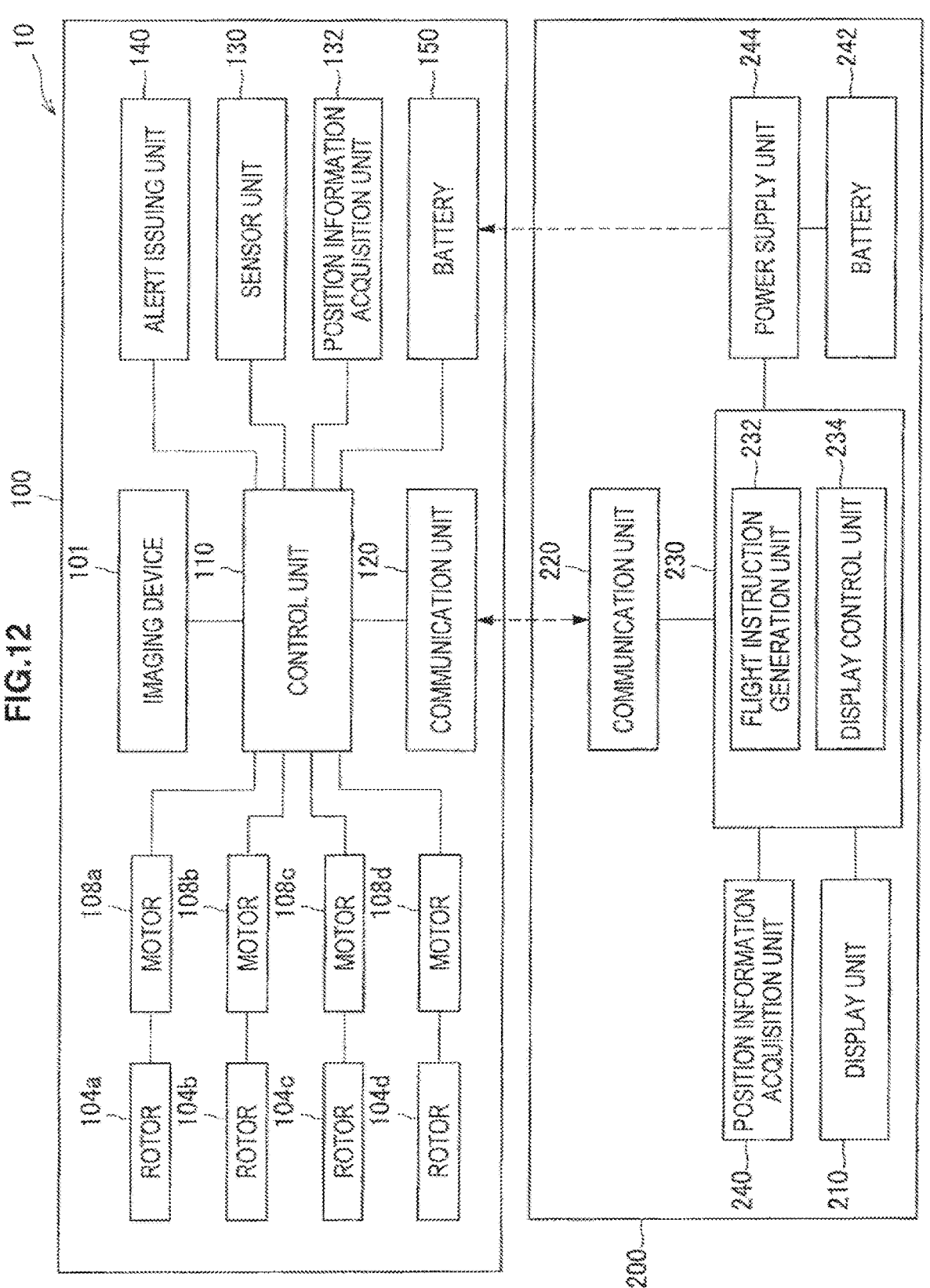
FIG. 12 is a descriptive diagram showing a functional configuration example of the flying device 100 and the controller 200 according to the embodiment of the present disclosure.

[Functional Configuration Example of the Imaging System]
FIG. 12 is a descriptive diagram showing a functional configuration example of the flying device 100 and the controller 200 according to the embodiment of the present disclosure. Hereinbelow, the functional configuration example of the flying device 100 and the controller 200 according to the embodiment of the present disclosure will be described using FIG. 12.

As shown in FIG. 12, the flying device 100 according to the embodiment of the present disclosure is configured to include the imaging device 101, the rotors 104a to 104d, motors 108a to 108d, a control unit 110, a communication unit 120, a sensor unit 130, a position information acquisition unit 132, an alert issuing unit 140, and a battery 150.

In addition, as shown in FIG. 12, the controller 200 according to the embodiment of the present disclosure is configured to include the display unit 210, a communication unit 220, a control unit 230, a position information acquisition unit 240, a battery 242, and a power supply unit 244. In addition, the control unit 230 is configured to include a flight instruction generation unit 232 and a display control unit 234.

The control unit 110 controls operations of the flying device 100. For example, the control unit 110 can control adjustment of rotation speeds of the rotors 104a to 104d according to adjustment of rotation speeds of the motors 108a to 108d, an imaging process performed by the imaging device 101, a transmission and reception process of information with another device (for example, the controller 200) via the communication unit 120, an alert issuing process performed by the alert issuing unit 140, and the like.

The imaging device 101 includes a lens, an image sensor such as a CCD image sensor or a CMOS image sensor, and the like as described above. The imaging device 101 included in the flying device 100 executes imaging of still images or moving images under the control of the controller 200. Images captured by the imaging device 101 are transmitted from the communication unit 120 to the controller 200.

The rotors 104a to 104d cause the flying device 100 to fly by generating a lift force from rotation. Rotation of the rotors 104a to 104d is caused by rotation of the motors 108a to 108d. The motors 108a to 108d cause the rotors 104a to 104d to rotate. The rotation of the motors 108a to 108d can be controlled by the control unit 110.

The communication unit 120 performs transmission and reception processes of information with the controller 200 through wireless communication. The flying device 100 transmits images captured by the imaging device 101 from the communication unit 120 to the controller 200. In addition, the flying device 100 receives instructions relating to flight from the controller 200 using the communication unit 120.

The sensor unit 130 is a group of devices that acquire a state of the flying device 100, and can include, for example, an acceleration sensor, a gyro sensor, an ultrasonic sensor, a pneumatic sensor, and the like. The sensor unit 130 can convert an acquired state of the flying device 100 into a predetermined signal, and provide the signal to the control unit 110 if necessary. The position information acquisition unit 132 acquires information of a current position of the flying device 100 using, for example, the GPS (Global Positioning System) or the like. The position information acquisition unit 132 can provide the acquired information of the current position of the flying device 100 to the control unit 110 if necessary.

The alert issuing unit 140 generates an alert using a sound, light, or the like based on control of the control unit 110 when the flying device 100 attempts to fly over a pre-set flight range.

The battery 150 stores electric power for operating the flying device 100. The battery 150 may be a primary battery that can only perform discharge, or may be a secondary battery that can also perform charge. When the battery 150 is a secondary battery, and the flying device 100 is integrated with the controller 200 as shown in, for example, FIG. 1 or the like, and the battery 150 can receive supply of electric power from the controller 200.

The display unit 210 includes a flat display device, for example, a liquid crystal display device, an organic EL display device, or the like as described above. The display unit 210 can display, for example, images captured by the imaging device 101 or information for controlling operations of the flying device 100. The display unit 210 is provided with a touch panel, and thus a user can perform a direct operation with respect to the information displayed on the display unit 210 by touching the display unit 210 with his or her finger, or the like.

The communication unit 220 transmits and receives information with the flying device 100 through wireless communication. The controller 200 receives images captured by the imaging device 101 from the flying device 100 using the communication unit 220. In addition, the controller 200 transmits instructions relating to flight of the flying device 100 to the flying device 100 from the communication unit 220. Commands relating to flight of the flying device 100 can be generated by the control unit 230.

The control unit 230 controls operations of the controller 200. For example, the control unit 230 can control a display process of text, figures, images, and other information on the display unit 210, a transmission and reception process of information with another device (for example, the flying device 100) via the communication unit 220, a power supply process performed by the power supply unit 244 with respect to the flying device 100, and the like.

The flight instruction generation unit 232 generates instructions relating to flight of the flying device 100. In the present embodiment, the flight instruction generation unit 232 generates the instructions relating to flight of the flying device 100 based on an operation with respect to images captured by the imaging device 101. As the flight instruction generation unit 232 generates the instructions relating to flight of the flying device 100 based on the operation with respect to images captured by the imaging device 101, the controller 200 enables a user who is not skilled at maneuvering the flying device 100 to easily maneuver the flying device 100. In addition, as the flight instruction generation unit 232 generates the instructions relating to flight of the flying device 100 based on the operation with respect to images captured by the imaging device 101, flight instructions for causing the flying device 100 to fly in a formation desired by the user can be generated. Note that a specific example of a process of generating an instruction relating to flight of the flying device 100 by the flight instruction generation unit 232 will be described later.

The display control unit 234 controls display of text, figures, images, and other information on the display unit 210. Display of text, figures, symbols, images, and other information on the display unit 210 in drawings to be referred to in later description is assumed to be controlled by the display control unit 234.

The position information acquisition unit 240 acquires information of a current position of the controller 200 using, for example, the GPS (Global Positioning System) or the like. The position information acquisition unit 240 can provide the acquired information of the current position of the controller 200 to the control unit 230 if necessary.

The battery 242 stores electric power for operating the controller 200. The battery 242 may be a primary battery that can only perform discharge, or may be a secondary battery that can also perform charge. When the flying device 100 is integrated with the controller 200 as shown in, for example, FIG. 1 or the like, the battery 242 can execute supply of electric power to the flying device 100 via the power supply unit 244. When the flying device 100 is integrated with the controller 200 as shown in, for example, FIG. 1 or the like, the power supply unit 244 supplies electric power stored in the battery 242 to the flying device 100 under the control of the control unit 230.

The flying device 100 and the controller 200 constituting the imaging system 10 according to the embodiment of the present disclosure have the configuration as shown in FIG. 12, and thus enable maneuvering of the flying device 100 based on the operation of images which are captured by the imaging device 101 and displayed on the display unit 210 of the controller 200. In other words, the user can control operations of the flying device 100 with the operation of the images captured by the imaging device 101, rather than manipulation of the flying device 100.

Information can be transmitted and received between the flying device 100 and the controller 200 through wireless communication using a frequency band of, for example, 2.4 GHz, 5 GHz, or the like based on the standard of IEEE 802.11, IEEE 802.15.1, or the like.

Hereinabove, the functional configuration example of the flying device 100 and the controller 200 according to the embodiment of the present disclosure has been described using FIG. 12. Next, an operation example of the imaging system 10 according to the embodiment of the present disclosure will be described.

[Operation Example of an Imaging System]

Figure 13:
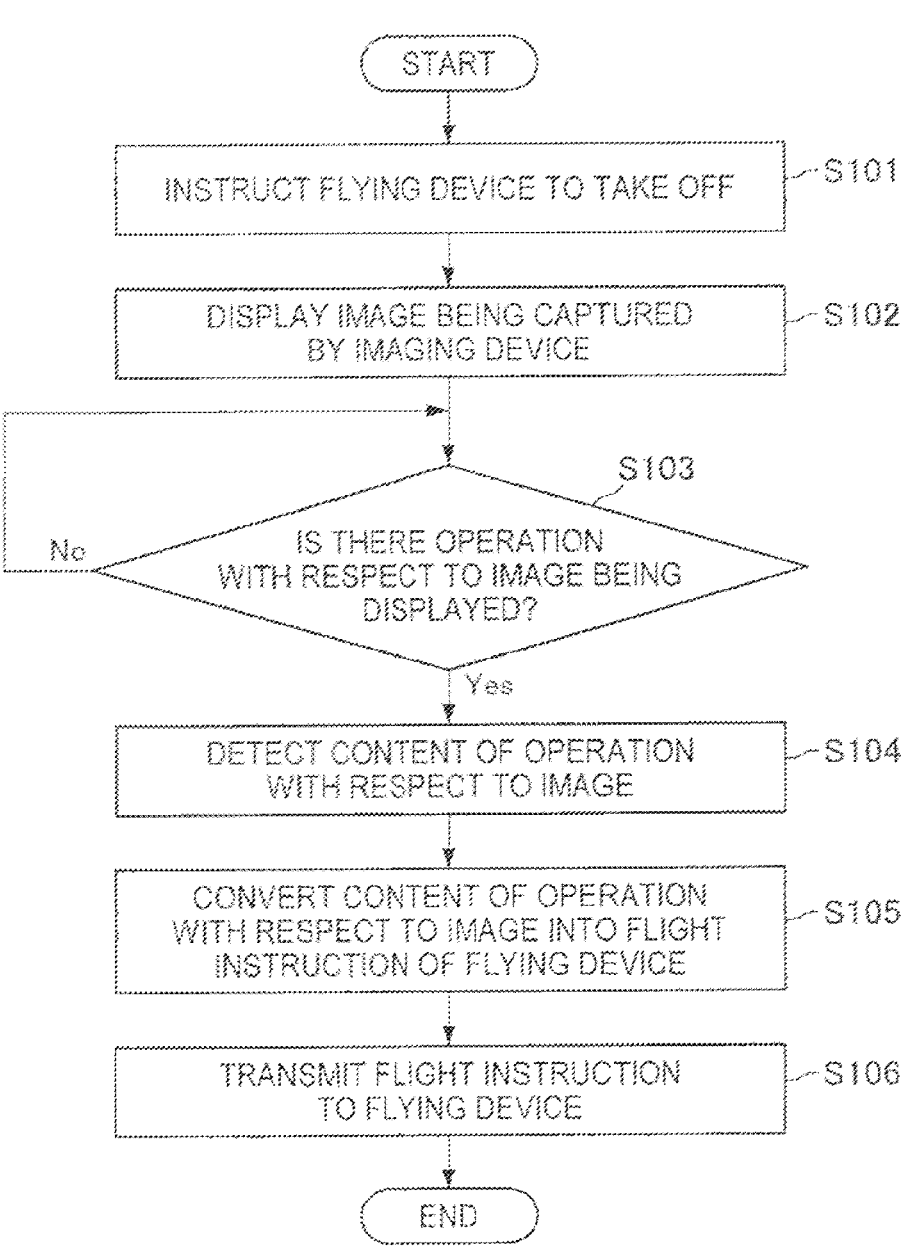
FIG. 13 is a flowchart showing an operation example of the imaging system 10 according to the embodiment of the present disclosure.

FIG. 13 is a flowchart showing an operation example of the imaging system 10 according to the embodiment of the present disclosure. Particularly, the drawing is of a flowchart showing an operation example of the controller 200 constituting the imaging system 10. The drawing shown in FIG. 13 is of an example of an operation performed when a user detaches the controller 200 from the flying device 100 and maneuvers the flying device 100 using the controller 200. Hereinbelow, the operation example of the imaging system 10 according to the embodiment of the present disclosure will be described using FIG. 13.

First, the controller 200 transmits a takeoff instruction based on user manipulation to the flying device 100 placed in a stand-still state on a table or a palm of the user (Step S101). When the flight instruction generation unit 232 detects that a predetermined manipulation corresponding to the takeoff instruction has been performed on the display unit 210 with a touch panel, the controller 200 causes the flight instruction generation unit 232 to generate the takeoff instruction of the flying device 100 and transmits the generated takeoff instruction to the flying device 100 through wireless communication.

When the flying device 100 receives the takeoff instruction from the controller 200, the control unit 110 causes the motors 108*a* to 108*d* to rotate. Then, the flying device 100 ascends with a lift power generated from rotation of the rotors 104*a* to 104*d* caused by the rotation of the motors 108*a* to 108*d*.

Then, the controller 200 receives an image captured by the imaging device 101 provided in the flying device 100 through wireless communication, and then causes the image to be displayed on the display unit 210 (Step S102). While the image captured by the imaging device 101 is displayed on the display unit 210, the controller 200 stands by until an operation with respect to the image displayed on the display unit 210 is performed (Step S103).

For example, when the user performs an operation with respect to the image displayed on the display unit 210 by touching the display unit 210, or the like, the controller 200 then detects the content of the operation with respect to the image displayed on the display unit 210 in the flight instruction generation unit 232 (Step S104). When the content of the operation with respect to the image displayed on the display unit 210 is detected, the controller 200 then converts the content of the operation into a flight instruction of the flying device 100 in the flight instruction generation unit 232 (Step S105).

Although a specific example will be described later in detail, for example, when the content of the operation detected in Step S104 is that a subject that the user designates is to be positioned at the center of the image captured by the imaging device 101, the flight instruction generation unit 232 converts the operation executed by the user into the flight instruction of the flying device 100.

When the content of the operation is converted into the flight instruction of the flying device 100 in Step S105 described above, the controller 200 then transmits the flight instruction obtained in the Step S105 described above to the flying device 100 through wireless communication (Step S106). The flying device 100 controls rotation of the motors 108*a* to 108*d* using the control unit 110 based on the flight instruction transmitted from the controller 200.

The imaging system 10 according to the embodiment of the present disclosure enables maneuvering of the flying device 100 based on the operation with respect to the image captured by the imaging device 101 and displayed on the display unit 210 of the controller 200 as the controller 200 is operated as described above. In other words, the user can control operations of the flying device 100 with the operation with respect to the image captured by the imaging device 101, rather than manipulation with respect to the flying device 100.

When the user views the image captured by the imaging device 101 and displayed on the display unit 210 and comes up with a desired formation, the user transmits an imaging instruction to the imaging device 101 using the controller 200. The flying device 100 transfers the imaging instruction from the control unit 110 to the imaging device 101 based on the imaging instruction transmitted from the controller 200. The imaging device 101 executes an imaging process based on the imaging instruction transferred from the control unit 110. Then, the flying device 100 transmits an image obtained from the imaging process of the imaging device 101 to the controller 200.

Hereinabove, the operation example of the imaging system 10 according to the embodiment of the present disclosure has been described. Next, an example of information displayed on the display unit 210 of the controller 200 constituting the imaging system 10 according to the embodiment of the present disclosure will be described.

Figure 14:
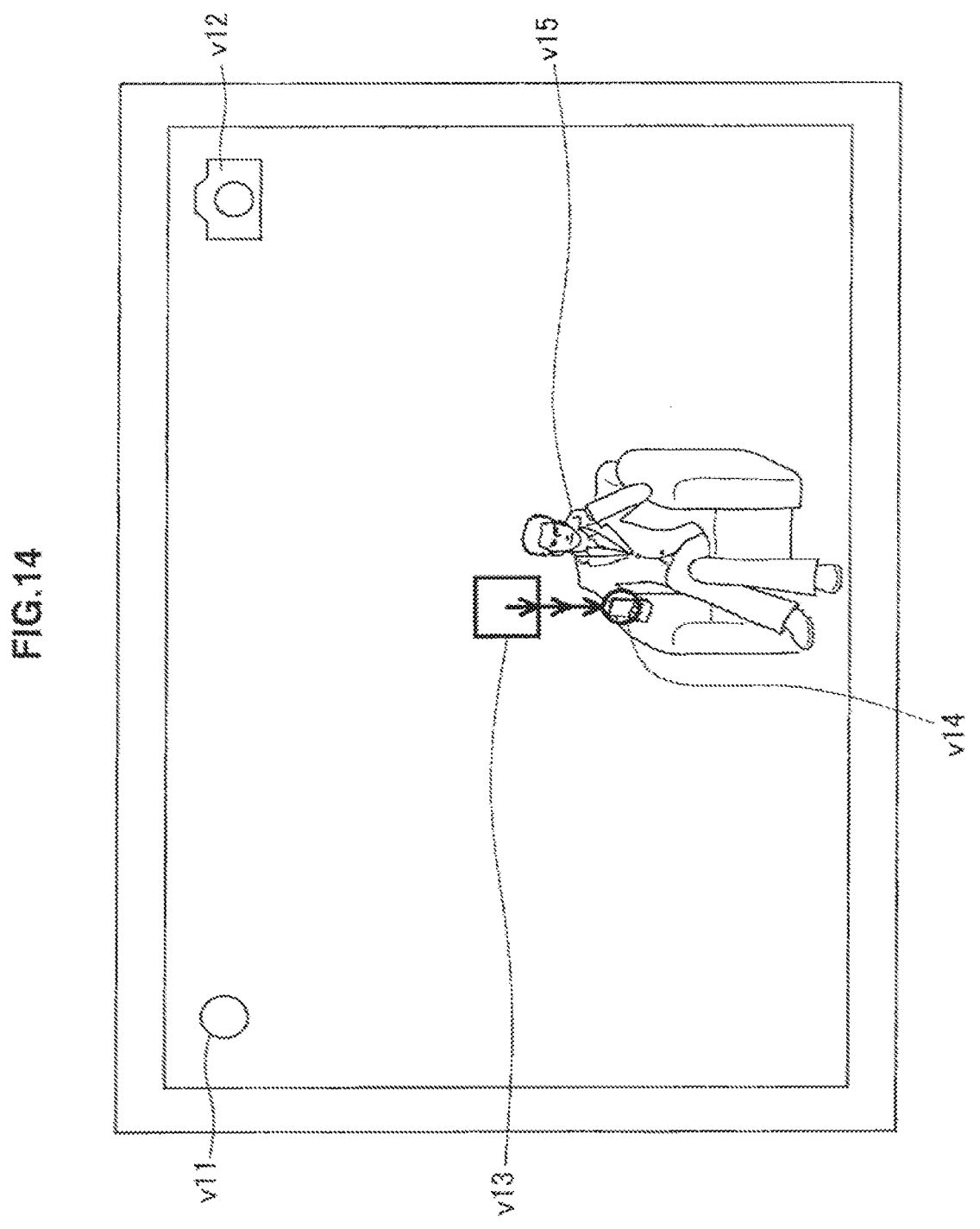

FIG. 14 is a descriptive diagram showing an example of information displayed on the display unit 210 of the controller 200 according to the embodiment of the present disclosure. Hereinbelow, the example of information displayed on the display unit 210 of the controller 200 will be described using FIG. 14.

In FIG. 14, a state in which a takeoff and landing button v11 and an imaging button v12 are displayed is shown superimposed on an image captured by the imaging device 101. The takeoff and landing button v11 is a button for causing the flying device 100 to take off or land. A user can cause the flying device 100 to take off or land by touching the takeoff and landing button v11. When the rotors 104*a* to 104*d* do not rotate, the takeoff and landing button v11 functions as a button for causing the flying device 100 to take off, and when at least one of the rotors 104*a* to 104*d* rotates, the takeoff and landing button v11 functions as a button for causing the flying device 100 to land.

The imaging button v12 is a button for causing the imaging device 101 to execute an imaging process. The user can cause the imaging device 101 to capture still images or moving images by touching the imaging button v12 to cause the imaging device 101 to execute the imaging process.

In addition, in FIG. 14, a state in which an object frame v13, a target position v14, and a moving arrow v15 are displayed is shown superimposed on the image captured by the imaging device 101. The object frame v13 has a function of indicating a region designated by an operation of the user. The target position v14 has a function of showing a target position of the region indicated by the object frame v13 in the captured image. The moving arrow v15 has a function of indicating a linear route of the object frame v13 to reach the target position v14.

When the user performs an operation to cause the region surrounded by the object frame v13 to reach the target position v14 on the image captured by the imaging device 101, the flying device 100 controls its own position and attitude such that the region surrounded by the object frame v13 reaches the target position v14. In addition, the controller 200 notifies the user of the fact that the flying device 100 is changing the position and the attitude by causing the moving arrow v15 to be displayed on the display unit 210 until the region surrounded by the object frame v13 reaches the target position v14.

A specific information display example of the display unit 210 will be described in more detail. First, an information display example of the display unit 210 when a user wants to set his or her designated position at the center of an image will be described.

FIGS. 15 and 16 are illustrative diagrams showing an example of information displayed on the display unit 210 of the controller 200 according to the embodiment of the present disclosure. The drawings shown in FIGS. 15 and 16 are of an information display example of the display unit 210 when the user wants to set his or her designated position at the center of the image. Hereinafter, the example of information displayed on the display unit 210 of the controller 200 will be described using FIGS. 15 and 16.

When the user wants to set his or her designated position at the center of the image, the controller 200 causes the user to perform, for example, an operation of tapping the designated position once. FIG. 15 shows a state in which the user executes the operation of tapping a given spot of the display unit 210 once. When the user taps the given spot of the display unit 210 once, the controller 200 causes the object frame v13 and the target position v14 to be displayed on the display unit 210. The display control unit 234 executes the display process of the display unit 210.

When the user taps the given spot of the display unit 210 once and the flight instruction generation unit 232 detects the tapping, the flight instruction generation unit 232 generates a flight instruction that causes the flying device 100 to fly so that the region surrounded by the object frame v13 is positioned in the target position v14. In addition, when the user taps the given spot of the display unit 210 once and the flight instruction generation unit 232 detects the tapping, the display control unit 234 executes display control such that the moving arrow v15 connecting the object frame v13 and the target position v14 is displayed on the display unit 210.

FIG. 16 shows a state after the user executes the operation of tapping the given spot of the display unit 210 once. As shown in FIG. 16, when the user executes the operation of tapping the given spot of the display unit 210 once, the display control unit 234 causes the moving arrow v15 connecting the object frame v13 and the target position v14 to be displayed on the display unit 210. The moving arrow v15 is displayed on the display unit 210 until the object frame v13 reaches the target position v14.

FIGS. 17 and 18 show an information display example of the display unit 210 when the user wants to set a position designated using tapping at the center of an image. As shown in FIG. 17, when the user taps a given spot of the display unit 210 once, the object frame v13, the target position v14, and the moving arrow v15 are displayed on the display unit 210. Then, when the flying device 100 reaches a desired position, a centering process in which the position designated by the user using tapping is set at the center of the image is executed as shown in FIG. 18.

When the user wants to set his or her designated position in a desired position, the controller 200 causes the user to perform, for example, an operation of dragging the designated position on the display unit 210. FIG. 19 is an illustrative diagram showing a state in which a user executes a drag operation on the display unit 210. When the user executes the drag operation of touching a given spot of the display unit 210 and moving his or her finger on the display unit 210 while touching the spot, the controller 200 causes the object frame v13 and the target position v14 to be displayed on the display unit 210. The display control unit 234 executes the display process of the display unit 210.

When the flight instruction generation unit 232 detects the drag operation of the user, the flight instruction generation unit 232 generates a flight instruction that causes the flying device 100 to fly so that the region surrounded by the object frame v13 is positioned in the target position v14. In addition, when the flight instruction generation unit 232 detects the drag operation of the user, the display control unit 234 executes display control such that the moving arrow v15 connecting the object frame v13 and the target position v14 is displayed on the display unit 210.

FIG. 20 is an illustrative diagram showing a state after a user executes the drag operation on the display unit 210. As shown in FIG. 20, when the user executes the drag operation on the display unit 210, the display control unit 234 causes the moving arrow v15 connecting the object frame v13 and the target position v14 to be displayed the display unit 210. The moving arrow v15 is displayed on the display unit 210 until the object frame v13 reaches the target position v14.

When the user wants to change magnification of an image, the controller 200 causes the user to perform, for example, an operation of spreading or closing two fingers on the display unit 210, that is, a so-called pinch operation. FIG. 21 is an illustrative diagram showing a state in which the user executes the pinch operation on the display unit 210. When the user executes the operation of touching a given spot of the display unit 210 with two fingers and spreading or closing the fingers on the display unit 210 while bringing the fingers into contact with the spot in the so-called pinch operation, the controller 200 causes the object frame v13 and the target position v14 to be displayed on the display unit 210. The display control unit 234 executes the display process of the display unit 210.

When the user has executed the pinch operation on the display unit 210, the display control unit 234 decides the object frame v13 having the middle point of the two fingers as the center thereof and causes the object frame to be displayed on the display unit 210. In addition, when the user has executed the pinch operation on the display unit 210, the display control unit 234 decides the target position v14 based on a movement amount to a position away from the positions with which the user's fingers come into contact and causes the target position to be displayed on the display unit 210.

As described above, the controller 200 that has detected the user operation performed on the image captured by the imaging device 101 and displayed on the display unit 210 causes a flight instruction corresponding to the user operation to be generated and transmitted to the flying device 100. Here, the generation of the flight instruction by the controller 200 will be described in more detail.

Flight of the flying device 100 is controlled by the controller 200 by giving image feedback so that an image captured by the imaging device 101 is in a state desired by a user. FIG. 22 is an illustrative diagram showing control of flight of the flying device 100 using image feedback.

When a user touches the display unit 210 with a touch panel as shown on the left side of FIG. 22, the flight instruction generation unit 232 detects the moment, and registers, as a reference image 251, a region of a predetermined size having the position that the user touches with his or her finger as the center. Since a target position is at the center of an image during the centering process described above caused by a tapping operation on a screen, the flight instruction generation unit 232 computes an image movement amount from the position that the user touches with his or her finger to the target position. Then, the flight instruction generation unit 232 computes a flight control command based on the computed image movement amount, and then transmits the command to the flying device 100.

In the next frame, an image captured by the imaging device 101 is changed due to a change of an attitude of the flying device 100. Thus, the flight instruction generation unit 232 performs image searching in the periphery of the position of the reference image 251 in the previous frame using template matching and then obtains the position of a region that is most similar to the region of the reference image 251, as shown on the right side of FIG. 22. Then, the flight instruction generation unit 232 computes a movement amount from the obtained position of the region to the target position, thereby computing a flight control command again, and then transmits the command to the flying device 100. This process is repeated until the region of the reference image 251 (or the region that is most similar to the region of the reference image 251) is sufficiently close to the target position.

During the drag operation on the display unit 210, the flight instruction generation unit 232 detects the moment at which the user touches the display unit 210 with his or her finger, and then registers the region of the predetermined size having the position that the user touches with his or her finger as the center as the reference image 251. Then, the flight instruction generation unit 232 keeps updating a position of the user's finger on the latest image as the target position until the user separates his or her finger from the display unit 210. Then, when the user separates his or her finger from the display unit 210, the flight instruction generation unit 232 sets the last position that the user touches with his or her finger as the target position as it is.

The flight instruction generation unit 232 can execute search for the image that is most similar to the reference image 251 by changing a search range (scale). Even if the size of the region of the reference image 251 is changed, the flight instruction generation unit 232 can compute a movement amount from a current size to a target size as the control of the position and convert the amount into a flight control command by executing search for the image with the changed scale.

The controller 200 can cause the flight control command to be generated based on the information designated by the user by touching the display unit 210, thereby controlling a flight state of the flying device 100. When the user newly touches another spot of the display unit 210 while the controller 200 controls a flight state of the flying device 100 based on a user operation, the controller can promptly replace a control target and then control the flight state of the flying device 100.

The correspondence relationship between a user operation on an image captured by the imaging device 101 and a movement of the flying device 100 will be described. FIGS. 23 to 26 are illustrative diagrams showing examples of the correspondence relationship between a user operation performed with respect to an image captured by an imaging device 101 and a movement of the flying device 100.

FIG. 23 shows the correspondence relationship between a user operation and a movement of the flying device 100 when the user executes an operation of moving an image captured by the imaging device 101 in the left direction. As shown in FIG. 23, when the user executes the operation of moving the image captured by the imaging device 101 in the left direction, the controller 200 causes a flight control command to rotate the flying device 100 horizontally clockwise to be generated and then causes the command to be transmitted to the flying device 100.

When the flying device 100 receives the flight control command to rotate the flying device horizontally clockwise from the controller 200, rotation of the rotors 104a to 104d is controlled such that the flying device flies while rotating horizontally clockwise as shown in FIG. 23. As the flying device 100 flies while rotating horizontally clockwise as described above, the flying device can change a position and an attitude thereof in a position in which an image can be captured in a formation desired by a user.

FIG. 24 shows the correspondence relationship between a user operation and a movement of the flying device 100 when the user executes an operation of moving an image captured by the imaging device 101 in the downward direction. As shown in FIG. 24, when the user executes the operation of moving the image captured by the imaging device 101 in the downward direction, the controller 200 causes a flight control command to raise the flying device 100 to be generated and then causes the command to be transmitted to the flying device 100.

When the flying device 100 receives the flight control command to raise the flying device from the controller 200, rotation of the rotors 104a to 104d is controlled such that the flying device flies upward as shown in FIG. 24. By flying upward, the flying device 100 can change its position and attitude in a position in which an image can be captured in a formation desired by the user.

FIG. 25 shows the correspondence relationship between a user operation and a movement of the flying device 100 when the user executes a pinch operation on an image captured by the imaging device 101 to reduce the image. As shown in FIG. 25, when the user executes the pinch operation on the image captured by the imaging device 101 to reduce the image, the controller 200 causes a flight control command to cause the flying device 100 to retreat to be generated and then causes the command to be transmitted to the flying device 100. Note that, herein, description is provided on the assumption that the side on which the imaging device 101 is provided is the front side of the flying device 100.

When the flying device 100 receives the flight control command to cause the flying device to retreat from the controller 200, the flying device controls rotation of the rotors 104a to 104d to fly backward as shown in FIG. 25. By flying backward as described above, the flying device 100 can change its position and attitude in a position at which an image can be captured in a size desired by the user through the pinch operation.

FIG. 26 shows the correspondence relationship between a user operation and a movement of the flying device 100 when the user executes a pinch operation on an image captured by the imaging device 101 to enlarge the image. As shown in FIG. 26, when the user executes the pinch operation on the image captured by the imaging device 101 to enlarge the image, the controller 200 causes a flight control command to cause the flying device 100 to advance to be generated and then causes the command to be transmitted to the flying device 100. Note that, herein, description is provided on the assumption that the side on which the imaging device 101 is provided is the front side of the flying device 100.

When the flying device 100 receives the flight control command to cause the flying device to advance from the controller 200, the flying device controls rotation of the rotors 104*a* to 104*d* to fly forward as shown in FIG. 26. By flying to advance as described above, the flying device 100 can change a position and an attitude thereof in a position in which an image can be captured in a size desired by the user through the pinch operation.

As described above, the controller 200 can convert a user operation performed on an image captured by the imaging device 101 into a flight control command of the flying device 100, and then transmit the flight control command to the flying device 100. In addition, the flying device 100 can change a position and an attitude thereof according to the user operation performed on the image captured by the imaging device 101.

As shown in FIG. 12, the flying device 100 includes the sensor unit 130. Since the flying device 100 includes the sensor unit 130, the flying device can detect surrounding obstacles. For example, if the flying device 100 includes an ultrasonic sensor as the sensor unit 130, the flying device 100 can estimate the distance from a floor to a ceiling during its flight. In addition, if the flying device 100 includes an image sensor as the sensor unit 130, for example, the flying device 100 can estimate the distance to a surrounding wall or the like based on environment recognition using the imaging device 101.

In addition, a case in which the flying device 100 comes into contact with a surrounding obstacle when the flying device moves to create a designated formation based on a user operation with respect to the image captured by the imaging device 101 is considered. In such a case, the controller 200 may cause a movement limitation to be displayed on the display unit 210 based on provision of information from the flying device 100.

FIG. 27 is an illustrative diagram showing an example of information displayed on the display unit 210 of the controller 200 constituting the imaging system 10 according to the embodiment of the present disclosure. FIG. 27 shows a state of a limitation range v17 that indicates a limitation of a sliding operation being displayed on the display unit 210. When sliding is performed by designating the inner side of the limitation range v17, the limitation range v17 notifies a user that the flying device 100 may collide with an obstacle such as a ceiling or the like. The controller 200 can notify the user that the flying device 100 may collide with an obstacle such as a ceiling by displaying the limitation range v17 in a flickering manner.

In addition, the controller 200 may control display of display unit 210 to notify the user of a difficulty of changing a desired formation by causing the moving arrow v15 to flicker in a different color (for example, red) from a normal one as shown in FIG. 27.

The imaging device 101 included in the flying device 100 can execute optical zooming using movements of a zoom lens, digital zooming using image conversion, or zooming by actually approaching or retreating from a subject. When the imaging device 101 has such a zoom function and a formation is designated by the user performing the pinch operation as shown in FIG. 21, for example, the flying device 100 has difficulty determining what kind of zoom function is better for zooming.

Thus, in general, the flying device 100 can preferentially execute the optical zooming in order to avoid a risk of collision caused by a movement. However, since the optical zoom certainly has a limitation in its zoom range, when the formation designated by the user is difficult to create using only the optical zoom, the flying device 100 can first operate a zoom lens of the imaging device 101, and then fly toward or away from a subject.

In addition, a case in which a shift occurs in a target change due to influence of wind or the like during flight control of the flying device 100 as shown in FIG. 22 is considered. When such a shift occurs in the target size, the flying device 100 performs flight control so that the shift in the target size is corrected by a movement. When a position at which imaging is performed by the imaging device 101 is shifted, flight control to correct the shift in the target size is controlled, thereby preventing an increasing shift from the original position with correction using zooming. In other words, the flying device 100 may make a change in a size using the optical zoom when the change in size is explicitly designated as shown in FIG. 21, or may adjust its position by a movement for other controls.

In order to further facilitate flight control of the flying device 100, a flight control command to cause the flying device 100 to move only in one direction may be generated by the controller 200. For example, when a user is caused to tap the display unit 210 once in the examples described above, the controller 200 performs flying control of the flying device 100 using image feedback so that the tapped position is positioned at the center of a captured image.

However, various kinds of operations such as those shown below may be provided to the user to further facilitate flight control of the flying device 100. For example, when the user is caused to tap the display unit 210 once and then is caused to perform a drag operation from the tapped position, the controller 200 can execute flight control such that the flying device 100 performs yaw-axis rotation.

FIG. 28 is an illustrative diagram showing an example of the correspondence relationship between a user operation performed with respect to an image captured by the imaging device 101 and a movement of the flying device 100. FIG. 28 shows an example when the user is caused to tap the display unit 210 and then to perform the drag operation from the tapped position.

As shown in FIG. 28, based on three-dimensional positions of the imaging device 101 and a tapped object, a coordinate system in which the center of the object is set to be the origin, the orientation of an optical axis of the imaging device is set to be the X axis, and two axes orthogonal to the X axis are set to be the Y and Z axes is obtained. When the user is caused to tap the display unit 210 once and then to perform the drag operation from the tapped position, the controller 200 can execute flight control such that the flying device 100 performs the yaw-axis rotation about the Z axis in the coordinate system. Accordingly, manipulation of the flying device 100 becomes easier and an image is captured by the imaging device 101 when the flying device 100 flies around the object, and the flying device 100 can capture the image with an effect of panoramic imaging.

In addition, when the user is caused to tap the display unit 210 once and then to perform the pinch operation from the tapped position, the controller 200 can execute flight control such that the flying device 100 flies toward or away from a subject.

FIG. 29 is an illustrative diagram showing another example of the correspondence relationship between a user operation performed with respect to an image captured by the imaging device 101 and a movement of the flying device 100. FIG. 29 shows an example when the user is caused to tap the display unit 210 once and then to perform the pinch operation in the tapped position.

As shown in FIG. 29, when the user is caused to tap the display unit 210 once and then to perform the pinch operation in the tapped position, the controller 200 can execute flight control such that the flying device 100 flies forward or backward along the X axis. A coordinate system in this case is decided based on three-dimensional positions of the imaging device 101 and a tapped object in the same manner as in FIG. 28. By capturing an image with the imaging device 101 while the flying device 100 flies as described above, the flying device 100 can capture the image of a subject in a size desired by the user.

As described above, the imaging system 10 according to the embodiment of the present disclosure causes the user to perform an operation on an image captured by the imaging device 101 included in the flying device 100 through the controller 200 rather than direct manipulation of the flying device 100. Based on the operation performed with respect to the image captured by the imaging device 101, the controller 200 causes a flight control command of the flying device 100 to be generated and then controls flight of the flying device 100 based on the generated flight control command. In this manner, by performing the operation on the image captured by the imaging device 101 included in the flying device 100 through the controller 200, the user can enjoy maneuvering the flying device 100 even when the user is not skilled at maneuvering the flying device 100. In addition, by capturing an image using the imaging device 101 included in the flying device 100, the user can easily capture an airborne image.

The imaging system 10 according to the embodiment of the present disclosure can allow a user to very easily maneuver the flying device 100. On the other hand, when imaging is performed using the flying device 100, the user does not have to hold a camera, and a situation in which it is difficult to control the flying device 100 as the user intends due to unexpected disturbance such as a sudden gust of wind or the like is considered. When the flying device 100 is difficult to control as the user intends, there may be a risk of collision with an environmental element such as a human, a wall, a ceiling, or the like.

The flying device 100 that constitutes the imaging system 10 according to the embodiment of the present disclosure includes the alert issuing unit 140 as shown in FIG. 12 in consideration of such a situation. The alert issuing unit 140 generates an alert using a sound, light, or the like based on control of the control unit 110 when the flying device 100 attempts to fly over a pre-set flight range. When the flying device 100 attempts to fly over the pre-set flight range, the alert issuing unit 140 generates an alert and thereby the flying device 100 can automatically warn the user or people nearby.

FIG. 30 is an illustrative diagram showing a state of the flying device 100 positioned inside a predetermined flight range 21 that has an initial position 20 as the center thereof. When unexpected disturbance such as a sudden gust of wind or the like occurs in this state, there is concern of the flying device 100 flying beyond the flight range 21. FIG. 31 is an illustrative diagram showing a state of the flying device 100 attempting to fly beyond the predetermined flight range 21 that has the initial position 20 as the center thereof.

Here, determination of whether or not the pre-set flight range has been exceeded may be made by the control unit 110 comparing, for example, position information acquired by the position information acquisition unit 132 included in the flying device 100 to position information acquired by the position information acquisition unit 240 included in the controller 200. When the determination is made based on the comparison of the position information, periodic transmission and reception of the position information between the flying device 100 and the controller 200 can be performed.

When an instruction is not transmitted from the controller 200 manipulated by the user for another predetermined period even though the alert issuing unit 140 has generated an alert, the flying device 100 can automatically land by controlling rotation of the motors 108a to 108d to cause rotation of the rotors 104a to 104d to slow down or stop. Determination of whether or not an instruction has been transmitted from the controller 200 after the alert issuing unit 140 has generated the alert can be made by the control unit 110. FIG. 32 is an illustrative diagram showing a state of the flying device 100 attempting automatic landing when an instruction has not been transmitted from the controller 200 even after the alert issuing unit 140 has generated the alert.

As described above, even when a situation in which it is difficult to control the flying device 100 as the user intends occurs due to a maneuver error made by the user or unexpected disturbance such as a sudden gust of wind or the like, the flying device 100 can warn people nearby by issuing an alert that the device has exceeded its pre-set flight range. In addition, when no instruction is given from the controller 200 even when an alert has been issued, the flying device 100 can perform automatic landing in order to avoid a collision with a person or an environmental element. With the operations as described above, the flying device 100 can drastically reduce a possibility of a collision with a person or an environmental element.

Since the flying device 100 includes the imaging device 101, the imaging system 10 according to the embodiment of the present disclosure can realize an operation of causing the flying device 100 to take off from a palm of the user, performing imaging with the imaging device 101, and then causing the flying device 100 to automatically return to the user. Hereinbelow, such an operation of the flying device 100 will be described.

FIG. 33 is an illustrative diagram showing an overview of an operation of causing the flying device 100 to perform automatic takeoff from a user, imaging, and returning to the user using the imaging system 10 according to the embodiment of the present disclosure. As shown in FIG. 33, when the flying device 100 that is present in a user's hand at first starts taking off based on, for example, a takeoff instruction from the controller 200, the flying device automatically flies to a position in which an appearance of the user can be imaged in pre-set formation. Then, after imaging of the user in the set formation is performed, the flying device 100 automatically returns to the user.

Since the flying device 100 flies as described above, the imaging system 10 according to the embodiment of the present disclosure can capture an image similar to an image captured using a tripod using the flying device 100 even in a place in which, for example, it is difficult to set a tripod.

There are various technologies for realizing automatic flying, imaging, and returning as described above, but in description below, a technology that realizes automatic flying, imaging, and returning based on image recognition will be disclosed.

FIG. 34 is a flowchart showing an operation example of the imaging system 10 according to the embodiment of the present disclosure. The drawing of FIG. 34 is of the operation example of the imaging system 10 when automatic flight, imaging, and returning of the flying device 100 based on image recognition are executed. Hereinbelow, the operation example of the imaging system 10 according to the embodiment of the present disclosure will be described using FIG. 34.

First, a user sets a desired formation in the imaging system 10 (Step S201). The imaging system 10 stores the formation set in Step S201 (Step S202). Various kinds of methods can be used in setting the formation, but an example of a method for setting the formation is as follows. For example, the imaging system 10 may allow the user to set the formation by allowing the user to touch the display unit 210 to designate a desired position and size of a face.

In addition, the imaging system 10 may cause the formation set in Step S201 to be stored in any of the flying device 100 or the controller 200. In addition, the imaging system 10 may cause the formation set in Step S201 to be stored in another device, for example, an external server device connected to the Internet, rather than in any of the flying device 100 or the controller 200.

When the desired formation is set in the imaging system 10, the user then causes the imaging system 10 to memorize the face that is an imaging target by capturing the image with the imaging device 101 (Step S203). The imaging system 10 creates a face recognition dictionary for identifying faces using images of faces captured by the imaging device 101 (Step S204).

The imaging system 10 may create the face recognition dictionary in any of the flying device 100 or the controller 200. In addition, the imaging system 10 may cause the created face recognition dictionary to be stored in another device, for example, an external server device connected to the Internet, rather than in any of the flying device 100 or the controller 200.

When the user has caused the imaging system 10 to memorize the face of the imaging target, the user then manipulates the controller 200 to cause the flying device 100 to take off (Step S205). The flying device 100 that has taken off flies while capturing an image with the imaging device 101. Then, the flying device 100 flies while controlling its position so that the stored position and size of the face in the image being captured by the imaging device 101 satisfy the formation set by the user (Step S206).

The control of the position in Step S206 can be performed according to, for example, whether or not the stored face is included in the image captured by the imaging device 101 or, if the stored image is included, the relationship between the position and the size of the face and a position and a size designated by the user.

When the flying device 100 determines that the stored position and the size of the face in the image being captured by the imaging device 101 satisfy the formation set by the user, the imaging device 101 captures the image (Step S207).

When the image is captured in Step S207, the flying device 100 flies while performing position control so that the face stored in the image being captured by the imaging device 101 is positioned at a short distance and on the front side thereof, in order to return to the user (Step S208). The position control in Step S208 can be performed in the same manner as the position control in Step S206.

When the flying device 100 is in sufficient proximity to the user, the user stretches out his or her palm under the flying device 100 (Step S209). When the flying device 100 detects stretching out of the user's palm using the sensor unit 130, the flying device gradually slows down rotation of the rotors 104a to 104d, and lands on the user's outstretched palm (Step S210).

With the operations of the flying device 100 and the controller 200 described above, the imaging system 10 according to the embodiment of the present disclosure can realize automatic flight, imaging, and returning of the flying device 100. By causing the flying device 100 to fly as described above, the imaging system 10 according to the embodiment of the present disclosure can exhibit the effect that an image similar to an image captured using a tripod can be captured using the flying device 100 even in a place in which, for example, it is difficult to set a tripod.

FIGS. 35 to 38 are illustrative diagrams showing control examples of positions and attitudes of the flying device 100 based on image recognition. FIG. 35 shows a case in which a face position v21 stored in an image being captured by the imaging device 101 is set apart from a face position v22 set by a user along the X axis. When a coordinate of the face position v21 is set to be Xf and a coordinate of the face position v22 is set to be Xt, a movement amount Ve of the flying device 100 per unit time is obtained with the following formula.

$$V\theta = K\theta \times (Xf - Xt)$$

Wherein, $K\theta$ is a coefficient.

FIG. 36 shows a case in which the face position v21 stored in the image being captured by the imaging device 101 is set apart from the face position v22 set by the user along the Y axis. When a coordinate of the face position v21 is set to be Yf and a coordinate of the face position v22 is set to be Yt, a movement amount Vy of the flying device 100 per unit time is obtained with the following formula.

$$Vy = Ky \times (Yf - Yt)$$

Wherein, Ky is a coefficient.

FIG. 37 shows a case in which a face orientation in the face position v21 stored in the image being captured by the imaging device 101 is different from a face orientation set by the user. When the face orientation in the face position v21 is set to be $\theta f$ and the face orientation set by the user is set to be $\theta t$, a movement amount Vx of the flying device 100 per unit time is obtained with the following formula.

$$Vx = Kx \times (\theta f - \theta t)$$

Wherein, Kx is a coefficient.

FIG. 38 shows a case in which a face size in the face position v21 stored in the image being captured by the imaging device 101 is different from a face size in the face position v22 set by the user. When the face size in the face position v21 is set to be Syf and the face size set by the user is set to be Syt, a movement amount Vz of the flying device 100 per unit time is obtained with the following formula.

$$Vz = Kz \times (Syf - Syt)$$

Wherein, Kz is a coefficient.

The imaging system 10 according to the embodiment of the present disclosure can control a position and an attitude of the flying device 100 by recognizing an image being captured by the imaging device 101 as described above.

Although the automatic returning of the flying device 100 based on image recognition is realized in the above-described examples, the present disclosure is not limited thereto. For example, by comparing the position information acquired by the position information acquisition unit 132 of the flying device 100 to the position information acquired by the position information acquisition unit 240 of the controller 200, the flying device 100 may execute flight control so as to approach a position of the controller 200. When returning of the flying device 100 is realized based on determination made by comparing the position information, periodic transmission and reception of the position information can be performed between the flying device 100 and the controller 200.

2. CONCLUSION

According to the embodiment of the present disclosure described above, the controller 200 that can maneuver the flying device 100 that flies with the plurality of rotors with simple operations is provided. The controller 200 causes images captured by the imaging device 101 provided in the flying device 100 to be displayed and converts operations performed with respect to the images by the user into commands for maneuvering the flying device 100.

The controller 200 according to the embodiment of the present disclosure converts the operations performed by the user with respect to the images captured by the imaging device 101 into commands for maneuvering the flying device 100, and then transmits the commands to the flying device 100. Accordingly, the controller 200 according to the embodiment of the present disclosure enables the user to maneuver the flying device 100 with an instantaneous operation.

Although the imaging system 10 obtained by integrating the controller 200 and the flying device 100 has been exemplified in the embodiment described above, it is needless to say that the present disclosure is not limited thereto. For example, even when it is difficult to integrate the controller 200 with the flying device 100, for example, a smartphone, a tablet-type mobile terminal, or the like may function as the controller 200.

It is not necessary to perform each step of a process executed by each device of the present specification in a time-series manner in the order described as a sequence diagram or a flowchart. For example, each step of a process executed by each device may be performed in an order different from the order described as a flowchart, or may be performed in parallel.

In addition, a computer program for causing hardware such as a CPU, a ROM, and a RAM installed in each device to exhibit the equivalent functions to those of each of the devices described above can also be created. In addition, a storage medium in which such a computer program is stored can also be provided. In addition, by configuring each of the functional blocks shown in the functional block diagram to be hardware, a series of processes can also be realized using hardware.

Hereinabove, although the preferred embodiments of the present disclosure have been described in detail with reference to the accompanying drawings, the present disclosure is not limited thereto. It is obvious that a person who has general knowledge in the field of the technology to which the present disclosure belongs can devise various kinds of modified examples or altered examples within the scope of the technical gist described in the claims, and it is understood that such examples surely belong to the technical scope of the present disclosure as well.

For example, although an image captured by the imaging device 101 provided in the flying device 100 is displayed and an operation performed by the user with respect to the image is converted into a command for maneuvering the flying device 100 in the embodiments described above, the present disclosure is not limited thereto. When the imaging device 101 has a panning function or a tilting function, for example, the controller 200 may convert an operation performed by a user with respect to an image captured by the imaging device 101 into a command for a panning operation or a tilting operation of the imaging device 101 and then transmit the command to the flying device 100.

In addition, the controller 200 may control the flying device 100 to enable capturing of an image desired by a user by combining a command for maneuvering the flying device 100 with a command for the panning operation of the tilting operation of the imaging device 101 generated from an operation performed by the user with respect to the image captured by the imaging device 101.

Additionally, the present technology may also be configured as below.

(1)

A control device including:

an image display unit configured to acquire, from a flying body, an image captured by an imaging device provided in the flying body and to display the image; and a flight instruction generation unit configured to generate a flight instruction for the flying body based on content of an operation performed with respect to the image captured by the imaging device and displayed by the image display unit.

(2)

The control device according to (1), wherein the flight instruction generation unit generates a flight instruction for the flying body based on content of an operation performed with respect to the image display unit displaying an image captured by the imaging device.

(3)

The control device according to (2), wherein the flight instruction generation unit generates a flight instruction for the flying body for causing the imaging device to perform imaging in a formation corresponding to the operation performed with respect to the image display unit.

(4)

The control device according to (3), wherein the flight instruction generation unit generates a flight instruction for the flying body instructing that a predetermined range designated in the operation performed with respect to the image display unit be positioned at a center of an image captured by the imaging device.

(5)

The control device according to (3), wherein the flight instruction generation unit generates a flight instruction for the flying body instructing that a predetermined range designated in the operation performed with respect to the image display unit be positioned in a position desired by a user in an image captured by the imaging device.

(6)

The control device according to (3), wherein the flight instruction generation unit generates a flight instruction for the flying body instructing that a predetermined range designated in the operation performed with respect to the image display unit have a size desired by a user in an image captured by the imaging device.

(7)

The control device according to any one of (3) to (6), further including:

a display control unit configured to control display of the image display unit, wherein the display control unit causes the image display unit to display a route of moving until the flying body is in a position enabling the imaging device to perform imaging in the formation corresponding to the operation performed with respect to the image display unit.

(8)

The control device according to (3), wherein, when the operation performed with respect to the image display unit is an operation of enlarging the image, the flight instruction generation unit generates a flight instruction instructing the flying body to advance.

(9)

The control device according to (8), wherein the operation of enlarging the image is a pinch operation performed with respect to the image display unit.

(10)

The control device according to (3), wherein, when the operation performed with respect to the image display unit is an operation of reducing the image, the flight instruction generation unit generates a flight instruction instructing the flying body to retreat.

(11)

The control device according to (10), wherein the operation of reducing the image is a pinch operation performed with respect to the image display unit.

(12)

The control device according to (3), wherein, when the operation performed with respect to the image display unit is an operation of causing the image to slide, the flight instruction generation unit generates a flight instruction instructing the flight body to move in a horizontal direction.

(13)

The control device according to (3), wherein, when the operation performed with respect to the image display unit is an operation of setting a designated position at a center of an image, the flight instruction generation unit generates a flight instruction instructing the flying body to move so that the center of the image captured by the imaging device is in the designated position.

(14)

The control device according to (13), wherein the operation of setting the designated position at the center of the image is a tapping operation performed with respect to the image display unit.

(15)

The control device according to (1), wherein the image display unit displays a path of the flying body to a target position while the flying body moves based on a flight instruction generated by the flight instruction generation unit.

(16)

The control device according to (1), wherein the image display unit displays a limit range in which the flying body is capable of moving on the image in a superimposed manner in an operation performed with respect to the image display unit.

(17)

A control method including:

acquiring, from a flying body, an image captured by an imaging device provided in the flying body and displaying the image; and converting content of an operation performed with respect to the image captured by the imaging device and displayed in the step of displaying into a flight instruction for the flying body.

(18)

A computer program causing a computer to execute:

acquiring, from a flying body, an image captured by an imaging device provided in the flying body and displaying the image; and converting content of an operation performed with respect to the image captured by the imaging device and displayed in the step of displaying into a flight instruction for the flying body.

What is claimed is:

1. A method performed by a flying camera, the method comprising:

driving rotors attached to a body of the flying camera so as to fly the flying camera;

with circuitry of the flying camera, wirelessly transmitting to a controller an image captured with a camera of the flying camera;

with the circuitry of the flying camera, detecting a target face;

with the circuitry of the flying camera, controlling the flying camera so that the target face being captured by the flying camera is positioned at a predetermined distance from the flying camera and so that the camera is facing the target face;

with the circuitry of the flying camera, detecting a part of a body of a user; and with the circuitry of the flying camera, slowing down rotation of the rotors and landing the flying camera on the part of the body of the user; and in response to the flying device attempting to fly beyond a predetermined flight range, controlling a user interface to generate an alert.

2. The method of claim 1, further comprising:

controlling the flying camera to take off from the part of the body of the user.

3. The method of claim 1, wherein the rotors are covered by rotor covers attached to the body of the flying camera.

4. The method of claim 1, further comprising:

moving the rotors into a storage position.

5. The method of claim 1, further comprising:

in response to an abnormality being detected, controlling the flying camera to land automatically.

6. The method of claim 5, wherein the abnormality includes a determination that a predetermined flight range has been exceeded.

7. The method of claim 5, wherein the abnormality includes not receiving an instruction from a user for a predetermined amount of time.

8. The method of claim 1, further comprising:

in a case that an instruction is not received from a user for a predetermined amount of time after the alert was generated, automatically landing the flying device.

9. The method of claim 1, further comprising:

after taking off from the part of the body of the user and performing imaging with the camera, landing the flying camera in response to a predetermined gesture by the user.

10. A flying camera, comprising:

a body;

rotors with arms attached to the body, the rotors configured to be rotated respectively to fly the body;

a camera disposed on the body and flown by the rotors with the body; and circuitry configured to wirelessly transmit to a control device an image captured with the camera, detect a target face, control the flying camera so that the target face being captured by the flying camera is positioned at a predetermined distance from the flying camera and so that the camera is facing the target face, detect a part of a body of a user, slow down rotation of the rotors and land the flying camera on the part of the body of the user, and in response to the flying device attempting to fly beyond a predetermined flight range, control a user interface to generate an alert.

11. The flying camera of claim 10, wherein the circuitry is further configured to control the flying camera to take off from the part of the body of the user.

12. The flying camera of claim 10, further comprising:

rotor covers attached to the body of the flying camera to cover the rotors.

13. The flying camera of claim 10, wherein the rotors are moveable into a storage position.

14. The flying camera of claim 10, wherein the circuitry is further configured to in response to an abnormality being detected, control the flying camera to land automatically.

15. The flying camera of claim 10, wherein the abnormality includes a determination that a predetermined flight range has been exceeded.

16. The flying camera of claim 10, wherein the abnormality includes not receiving an instruction from a user for a predetermined amount of time.

17. The flying camera of claim 1, wherein the circuitry is further configured to in a case that an instruction is not received from a user for a predetermined amount of time after the alert was generated, automatically land the flying device.

18. The flying camera of claim 10, wherein the circuitry is further configured to after taking off from the part of the body of the user and performing imaging with the camera, land the flying camera in response to a predetermined gesture by the user.

* * * * *